US012478869B2

(12) United States Patent
Togashi et al.

(10) Patent No.: US 12,478,869 B2
(45) Date of Patent: Nov. 25, 2025

(54) CONTENT HOLDING SYSTEM, STORAGE MEDIUM AND CONTENT HOLDING SERVER

(71) Applicants: Nintendo Co., Ltd., Kyoto (JP); The Pokemon Company, Tokyo (JP)

(72) Inventors: Hiroki Togashi, Tokyo (JP); Nobuyuki Ohta, Tokyo (JP)

(73) Assignees: Nintendo Co., Ltd., Kyoto (JP); The Pokémon Company, Tokyo (JP)

( * ) Notice: Subject to any disclaimer, the term of this patent is extended or adjusted under 35 U.S.C. 154(b) by 678 days.

(21) Appl. No.: 17/878,101

(22) Filed: Aug. 1, 2022

(65) Prior Publication Data

US 2023/0356078 A1 Nov. 9, 2023

(30) Foreign Application Priority Data

May 9, 2022 (JP) ................................ 2022-077161

(51) Int. Cl.
*A63F 13/49* (2014.01)

(52) U.S. Cl.
CPC ........ *A63F 13/49* (2014.09); *A63F 2300/208* (2013.01)

(58) Field of Classification Search
CPC ..... A63F 13/49; A63F 13/58; A63F 2300/208
See application file for complete search history.

(56) References Cited

U.S. PATENT DOCUMENTS 11,243,931 B2 2/2022 Ishihara et al.
2007/0087835 A1* 4/2007 Van Luchene ........ A63F 13/792 463/43
2012/0077599 A1* 3/2012 Van Luchene ........ A63F 13/533 463/42
2020/0376372 A1 12/2020 Sowa et al.
2022/0054945 A1* 2/2022 Salik ....................... A63F 13/58

FOREIGN PATENT DOCUMENTS

| | | | |
|---|---|---|---|
| JP | 2000-185178 | 7/2000 | |
| JP | 2014-023881 | 2/2014 | |
| JP | 2018-202188 | 12/2018 | |
| JP | 2019-146998 | 9/2019 | |
| JP | 6751181 B1 | 9/2020 | |
| JP | 2020-192012 | 12/2020 | |
| JP | 2020-192013 | 12/2020 | |
| JP | 2020192012 A * | 12/2020 | ............ A63F 13/73 |

* cited by examiner

*Primary Examiner* — Steven J Hylinski
(74) *Attorney, Agent, or Firm* — Nixon & Vanderhye P.C.

(57) ABSTRACT

A non-limiting example content holding system includes a game apparatus and a server, which are connected to each other communicably via a network. Multiple types of games can be played on the game apparatus, and a character used in the game can be deposited with the server. In a case of depositing a character with the server, character data is converted into a format having a common area and an inherent area of a game. When keeping the character, the server updates, in withdrawal character data of the character, only common data and data of the inherent area used in the game. When withdrawing a deposited character, the game apparatus acquires, from withdrawal character data held on the server, the character data having the common area, and the inherent area of the game that uses the character to be withdrawn, and converts the acquired character data into a format to be used in the game, and saves the converted data while including in save data.

8 Claims, 17 Drawing Sheets

CHARACTER INFORMATION DB 54b BEFORE UPDATE

FIG. 10

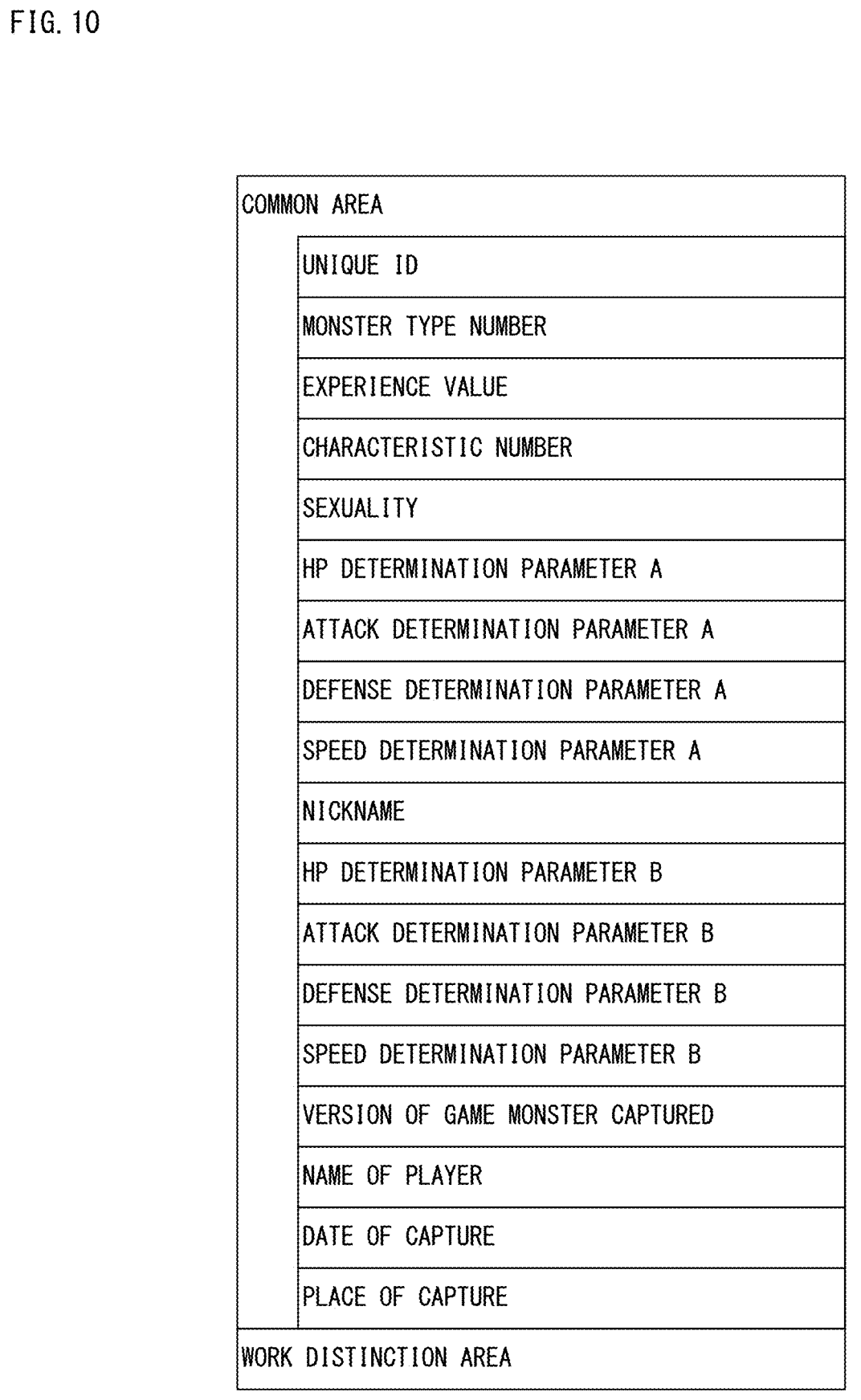

| | |
|---|---|
| COMMON AREA | |
| | UNIQUE ID |
| | MONSTER TYPE NUMBER |
| | EXPERIENCE VALUE |
| | CHARACTERISTIC NUMBER |
| | SEXUALITY |
| | HP DETERMINATION PARAMETER A |
| | ATTACK DETERMINATION PARAMETER A |
| | DEFENSE DETERMINATION PARAMETER A |
| | SPEED DETERMINATION PARAMETER A |
| | NICKNAME |
| | HP DETERMINATION PARAMETER B |
| | ATTACK DETERMINATION PARAMETER B |
| | DEFENSE DETERMINATION PARAMETER B |
| | SPEED DETERMINATION PARAMETER B |
| | VERSION OF GAME MONSTER CAPTURED |
| | NAME OF PLAYER |
| | DATE OF CAPTURE |
| | PLACE OF CAPTURE |
| WORK DISTINCTION AREA | |

FIG. 11

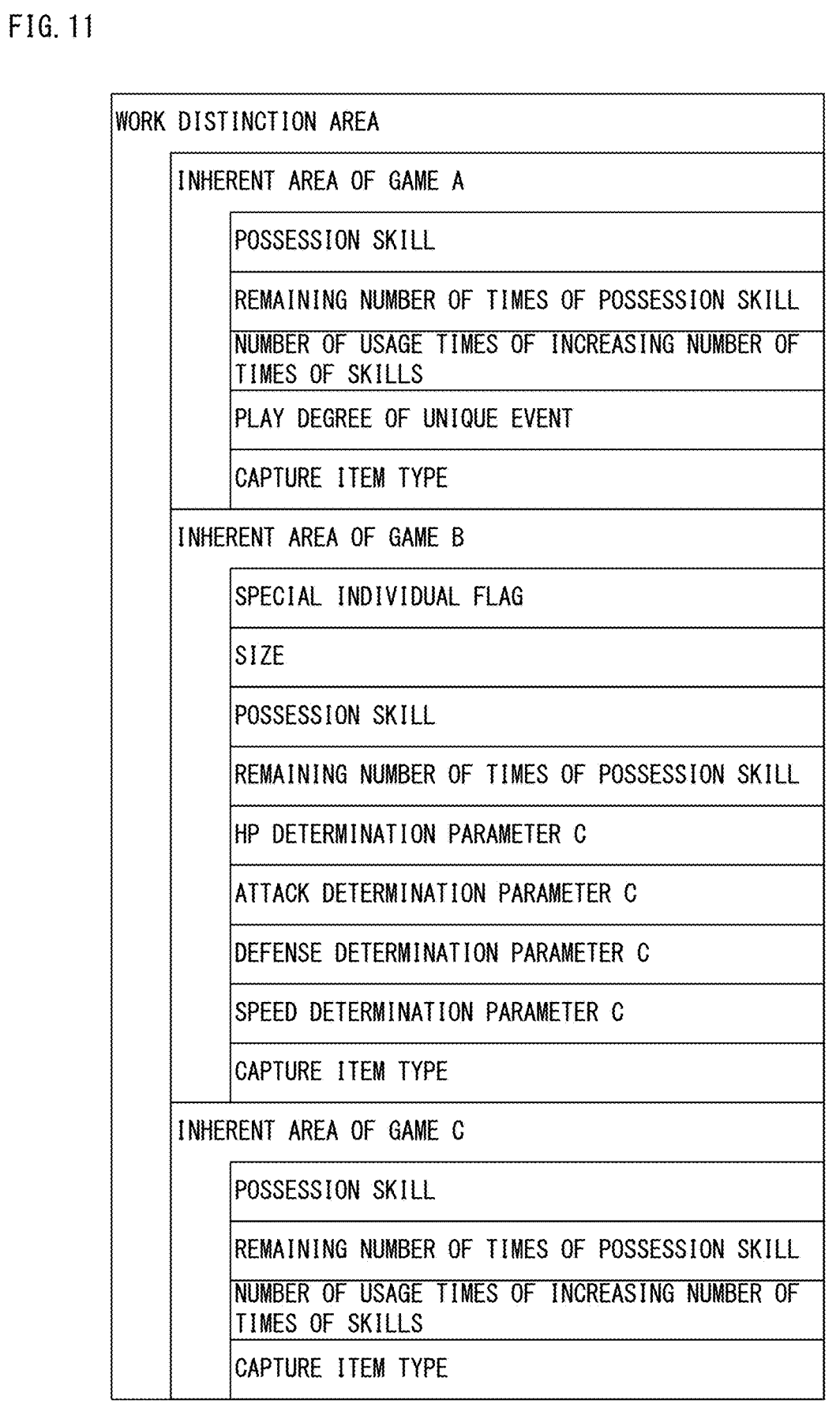

- WORK DISTINCTION AREA
  - INHERENT AREA OF GAME A
    - POSSESSION SKILL
    - REMAINING NUMBER OF TIMES OF POSSESSION SKILL
    - NUMBER OF USAGE TIMES OF INCREASING NUMBER OF TIMES OF SKILLS
    - PLAY DEGREE OF UNIQUE EVENT
    - CAPTURE ITEM TYPE
  - INHERENT AREA OF GAME B
    - SPECIAL INDIVIDUAL FLAG
    - SIZE
    - POSSESSION SKILL
    - REMAINING NUMBER OF TIMES OF POSSESSION SKILL
    - HP DETERMINATION PARAMETER C
    - ATTACK DETERMINATION PARAMETER C
    - DEFENSE DETERMINATION PARAMETER C
    - SPEED DETERMINATION PARAMETER C
    - CAPTURE ITEM TYPE
  - INHERENT AREA OF GAME C
    - POSSESSION SKILL
    - REMAINING NUMBER OF TIMES OF POSSESSION SKILL
    - NUMBER OF USAGE TIMES OF INCREASING NUMBER OF TIMES OF SKILLS
    - CAPTURE ITEM TYPE

CONTENT HOLDING SYSTEM, STORAGE MEDIUM AND CONTENT HOLDING SERVER

CROSS-REFERENCE OF RELATED APPLICATION

This application claims a priority to Japanese Patent Application No. 2022-077161 filed on May 9, 2022, the entire contents of which are incorporated herein by reference.

FIELD

This application describes a content holding system, a storage medium and a content holding server, which use some characters selected from a plurality of characters that a user owns for predetermined information processing.

SUMMARY

It is a primary object of an embodiment(s) to provide a novel content holding system, storage medium and content holding server.

It is another object of the embodiment(s) to provide a content holding system, storage medium and content holding server, capable of holding a content(s) in a state where parameters different for each type of games can be used when using the content(s) in multiple types of games.

A first embodiment is a content holding system comprising a server and at least one information processing terminal connectable to the server. The server comprises a content storage medium that stores content data that is data of at least one content that is usable in multiple types of games, for each content; and a first processor that executes a server control program that manages the content data, wherein the content data stored in the content storage medium has, for each content, a common area that includes a parameter group commonly used in the multiple types of games and an inherent area that includes a parameter group used individually for each of the multiple types of games, out of a plurality of parameters that are used when using the character in the game. The information processing terminal comprises a first save data storage medium that stores first save data that is save data of a first game that is either of the multiple types of games; and a second processor that executes a client program that manages the content to be transmitted to or received form the server, wherein the client program causes the second processor to read the first save data from the first save data storage medium; to generate, based on the first save data, as for at least one first content used in the first game, deposit content data including at least a common area and a first inherent area that is an inherent area corresponding to the first game; and to transmit generated deposit content data to the server, wherein the server control program causes, when receiving from the information processing terminal the deposit content data related to the first content, the first processor to store in the content storage medium as latest content data related to the first content, content data that includes at least the common area and the first inherent area that are included in the received deposit content data, and further includes an inherent area other than the first inherent area being held when content data having the inherent area other than the first inherent area is held in the content storage medium in connection to the first content.

According to the first embodiment, since only the common area and the first inherent area used in the first game are updated and held in the server, it is possible to use a further inherent area in a further game. Therefore, it is possible to use a single content in multiple types of games mutually. That is, in a case of using the content in the multiple types of games, the content can be held in a state where different parameters can be used for each type of the games.

A second embodiment is the content holding system according to the first embodiment, wherein the information processing terminal further comprises a second save data storage medium that stores second save data that is save data of a second game either of the multiple types of games. The server control program causes, when there is a request for transmission of the first content used in the second game from the information processing terminal, the first processor to generate, based on the content data of the first content, withdrawal content data that includes the common area at least, and further second inherent area at least, when a second inherent area corresponding to the second game is held; and to transmit to the information processing terminal while making the content storage medium hold the content data. The client program causes the second processor to update the second save data so as to include the first content based on the common area and the second inherent area included in the received withdrawal content data, and to store the updated second save data in the second save data storage medium.

According to the second embodiment, since only the common area and the second inherent area that are used in the second game can be reflected in the second save data, even if the content data that includes a further inherent area that cannot be used in the second game are included is held in the server, it is possible to use the content in the second game without corresponding to the further inherent area on the second game side.

A third embodiment is the content holding system according to the second embodiment, wherein the withdrawal content data includes the common area and all held inherent areas in the content data related to the first content.

A fourth embodiment is the content holding system according to the second embodiment, wherein the client program further causes the second processor to generate, when the second inherent area is not included in the received withdrawal content data, a parameter group corresponding to the second area so as to update the second save data, and to store the updated second save data in the second save data storage medium.

A fifth embodiment is the content holding system according to the second embodiment, wherein the server control program further causes the first processor to store the content data that the first content is made to be withdrawable state when the deposit content data related to the first content is received from the information processing terminal, to transmit, when there is a request for transmission of the first content from the information processing terminal in a state where the first content is withdrawable, the withdrawal content data while remaining the content data being held, and to hold the content data so that the first content data is made disable to be withdrawn when the first content is being stored to be included in the second save data in the second save data storage medium.

A sixth embodiment is the content holding system according to the first embodiment, wherein the common area of the content data includes at least an ID unique to the content, and the server control program further causes, when the deposit content data is received from the information processing terminal, the first processor to store the content data in the content storage medium while newly applying an ID if no ID is included in the first content.

A seventh embodiment is the content holding system according to the first embodiment, wherein the deposit content data further includes a third inherent area corresponding to a third game that is either of the multiple types of games.

According to the seventh embodiment, it is possible to ensure that an inherent area of a specific game is included for some purpose.

An eighth embodiment is a non-transitory computer readable storage medium that stores a content management program executable by a computer of an information processing apparatus. The information processing apparatus comprises a first save data storage medium that stores first save data that is save data of a first game that is either of the multiple types of games and a second save data storage medium that stores second save data that is save data of a second game either of the multiple types of games. The content management program causes a processor of the computer to read the first save data from the first save data storage medium based on a first pointing instruction, to generate, based on the first save data, as for at least one first content used in the first game, deposit content data including at least a common area and a first inherent area that is an inherent area corresponding to the first game; to transmit generated deposit content data to the server; to perform, based on a second pointing instruction, a request for transmission of the first content that is used in a second game that is either of the multiple types of games to the server; to receive from the server, according to the request for transmission, in connection to the first content, withdrawal content data that includes the common area and the inherent area; and to update the second save data so as to include the first content based on at least the common area and the second inherent area included in the withdrawal content data so as to store in the second save data storage medium.

A ninth embodiment is a content holding server comprising a content storage medium that stores content data that is data of at least one content that is usable in multiple types of games, for each content; and a processor that executes a control program that manages the content data. The content data stored in the content storage medium has, for each content, a common area that includes a parameter group commonly used in the multiple types of games and an inherent area that includes a parameter group used individually for each of the multiple types of games, out of a plurality of parameters that are used when using the character in the game. The processor executing the control program from an information processing terminal deposit content data that includes at least a common area and a first inherent area corresponding to a first game that is either of multiple types of games related to a first content; stores in the content storage medium as latest content data related to the first content, content data that includes at least the common area and the first inherent area that are included in the received deposit content data, and further includes an inherent area other than the first inherent area being held when content data having the inherent area other than the first inherent area is held in the content storage medium in connection to the first content; generates, when there is a request for transmission of the first content used in the second game from the information processing terminal, based on the content data of the first content, withdrawal content data that includes the common area at least, and further second inherent area at least, when a second inherent area corresponding to the second game is held; and transmits the withdrawal content data to the information processing terminal while making the content storage medium hold the content data.

According to each of the eighth embodiment and the ninth embodiment, as similar to the first embodiment, in a case of using the content in the multiple types of games, the content can be held in a state where different parameters can be used for each type of the games.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 10 is a view showing a part of non-limiting example detailed contents of the character data held in the content holding server.

FIG. 11 is a view showing another part of the non-limiting example detailed contents of the character data held in the content holding server.

DETAILED DESCRIPTION OF THE PREFERRED EMBODIMENTS

Figure 1:
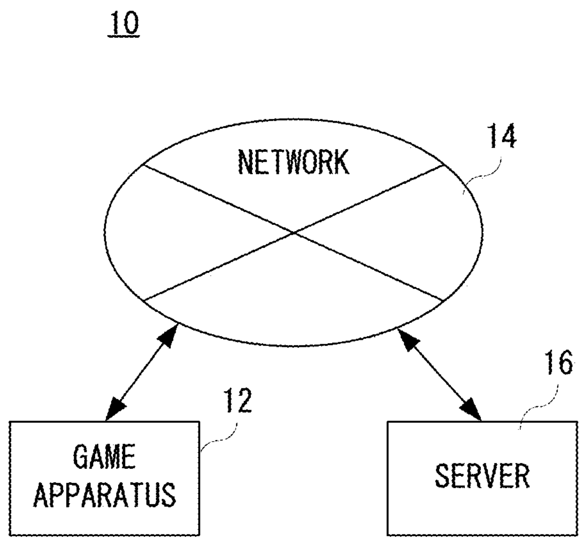
FIG. 1 is a view showing a non-limiting example content holding system.

With reference to FIG. 1, a non-limiting example content holding system 10 comprises a game apparatus 12, and the game apparatus 12 is connected to a content holding server (hereinafter, simply referred to as a "server") 16 communicably via a network 14, such as an internet.

The game apparatus 12 is an example of an information processing apparatus or terminal, and may be not only a game dedicated apparatus but various types of electronic devices equipped with a game function. Such electric devices may be a smartphone, a cellular phone (feature phone), a tablet PC, a laptop PC, and so on. However, it does not need to be limited to portable electronic devices, and stationary electronic devices such as stationary game devices, arcade game devices, and desktop PCs can also be used.

The server 16 may be a general-purpose server. The server 16 stores or holds (i.e., manages) character data included in game data of a virtual game that is playable on the game apparatus 12 of this embodiment in an internal memory or a data base connected to an exterior in association with information of a user or player (hereinafter, simply referred to as "user" of the game apparatus 12.

Figure 2:
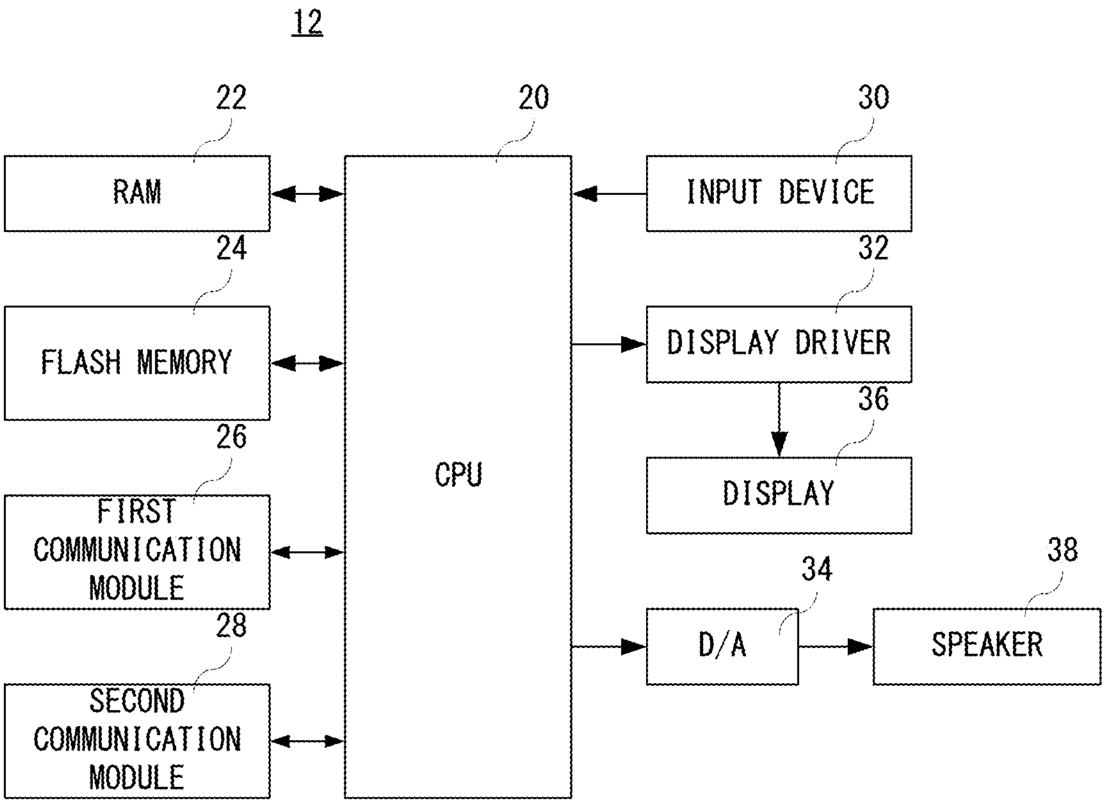
FIG. 2 is a block diagram showing non-limiting example electric structure of a game apparatus shown in FIG. 1.

FIG. 2 is a block diagram showing non-limiting example electric structure of the game apparatus 12 shown in FIG. 1. As shown in FIG. 2, the game apparatus 12 includes a CPU 20, and the CPU 20 is connected with a RAM 22, a flash memory 24, a first communication module 26, a second communication module 28, an input device 30, a display driver 32 and a D/A converter 34. Moreover, a display 36 is connected to the display driver 32, and a speaker 38 is connected to the D/A converter 34.

The CPU 20 is in charge of overall control of the game apparatus 12. However, instead of the CPU 20, an SoC (System-on-a-chip) including multiple functions, such as a CPU function, a GPU function, etc. may be provided. The RAM 22 is a volatile storage medium, and is used as a working memory and a buffer memory, for the CPU 20. The flash memory 24 is a nonvolatile storage medium, and used in order to store application program such as a game, and to store (save) various kinds of data.

In this embodiment, not only the game application but a program for managing characters used in the game ("client side data management program", described later) are stored. In this embodiment, the characters are characters of monsters imitated animals as an example.

In addition, on the game apparatus 12, it is possible to execute various types of applications, such as a document creation application, an email application, a drawing application, a character practice application, a language training application, a learning application, etc., and there is an occasion that these applications are stored in the flash memory 24.

The first communication module 26 has a function for accessing a wireless LAN by a system conforming to the standard of IEEE 802.11.b/g, for example. Therefore, for example, the CPU 20 transmits or receives data to or from other equipment (such as the server 16, other game apparatuses, etc.) via an access point and the internet (i.e., network 14) with using the first communication module 26. However, it is also possible to transmit or receive data to or from other equipment directly with using the communication module 26.

The second communication module 28 may have a function of performing a short-distance wireless communications. Specifically, the second communication module 28 has a function to transmit or receive an infrared signal to or from other equipment with a predetermined communication system (infrared system, for example), and a function to perform wireless communication with the same or similar type of game apparatus according to a predetermined communication protocol (multilink protocol, for example). Therefore, for example, the CPU 20 can transmit or receive data to or from the same or similar type of other game apparatuses directly using the second communication module 28. However, instead of the short-distance wireless communication of the infrared system, a short-distance wireless communication according to other wireless-communication standards such as Bluetooth (registered trademark) may be performed.

The input device 30 may be various kinds of push buttons or switches provided on the game apparatus 12, and is used various kinds of operations such as menu selection, game operation, etc. However, as the input device 30, a pointing device such as a touch panel, an input means such as a microphone, a camera, etc. may be provided instead of the push buttons or switches, or in addition to the push buttons or switches. Moreover, a touch panel may be integrally incorporated within the display 36.
The display 36 in this case is a touch panel integrated type display.

The display driver 32 is used in order to display various kinds of images (screens) such as a game image on the display 36 under the control by the CPU 20. Although illustration is omitted, the display driver 32 contains a video RAM (VRAM). The display 36 may be an LCD or an organic EL display.

The D/A converter 34 converts sound data applied from the CPU 20 into an analog game sound so as to output to the speaker 38. However, the game sound means a sound necessary for a game, such as voices of characters or objects, sound effects, music (BGM).

In addition, the electric structure of the game apparatus 12 shown in FIG. 2 is a mere example, and does not need to be limited to this. For example, the second communication module 28 may be dispensed with.

Figure 3:
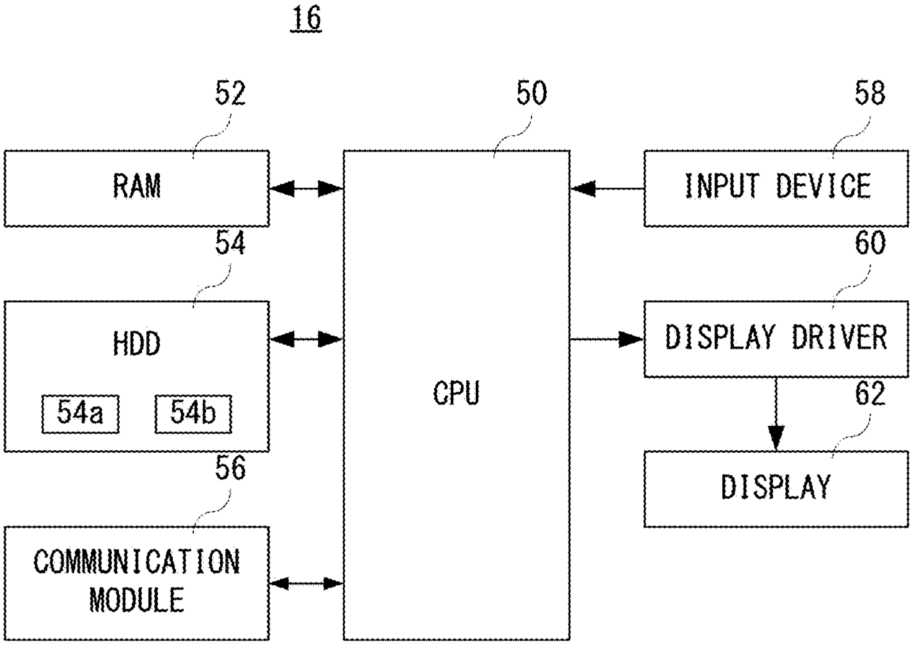
FIG. 3 is a block diagram showing non-limiting example electric structure of a content holding server shown in FIG. 1.

FIG. 3 is a block diagram showing non-limiting example electric structure of the server 16 shown in FIG. 1. As shown in FIG. 3, the server 16 includes a CPU 50, and the CPU 50 is connected with a RAM 52, an HDD 54, a communication module 56, an input device 58 and a display driver 60. Moreover, a display 62 is connected to the display driver 60.

The CPU 50 is in charge of overall control of the server 16. The RAM 52 is a volatile storage medium, and is used as a working memory and a buffer memory, for the CPU 50. The HDD 54 is a nonvolatile storage medium, and is used in order to store an operating system (OS) and necessary control programs and to store or hold predetermined data. In this embodiment, the necessary control programs include a program for managing characters ("server side data management program", described later). Moreover, as the predetermined data, there are a data base for managing character data of the characters used in one or more games (hereinafter, referred to as "character management data base") 54*a* and a data base for holding character data of the characters used in one or more games (hereinafter, referred to as "character information data base") 54*b*. However, the character management data base 54*a* and the character information data base 54*b* may be provided in an exterior of the server 16. In this case, the character management data base 54*a* and the character information data base 54*b* may be directly connected to the server 16, or may be provided communicably to the server 16 via the network 14.

The communication module 56 may have a function of accessing a LAN with wire or wirelessly. Therefore, the server 16 can perform a communication with the game apparatus 12 and other game apparatuses via the network 14. However, the server 16 can perform a communication directly with the game apparatus 12 and other game apparatuses without via the network 14.

The input device 58 may be a keyboard, a computer mouse, etc., for example. The display driver 60 is used in order to display various screens on the display 62 under the control of the CPU 50. The display driver 60 contains a video RAM (VRAM). The display 62 may be an LCD or an organic EL display.

In addition, the electric structure of the server 16 shown in FIG. 3 is a mere example, and should not need to be limited to this.

In the above-described content holding system 10, it is possible to play multiple types of games on the game apparatus 12, and a character (equivalent to a content) acquired by playing a certain type of game can be used in another different type of game.

When using the character in a further different type of game, the character acquired in a certain game is once deposited with the server 16, and the character concerned is withdrawn from the server 16 in order to use in the further game. In this case, character data of the character that is deposited or withdrawn is transmitted or received between the game apparatus 12 and the server 16.

However, it is possible not only to withdraw the character acquired in a certain type of game from the server 16 for use in another type of game, but also to withdraw the character from the server 16 for use in the same type of game in the same way.

Moreover, as described later, since the server 16 holds the character data of the character, even when the character is withdrawn from the server 16 to the game apparatus 12, the character data that is being held in the server 16 is not eliminated.

Moreover, although a certain game and another game are different types of games, each of them is a game in which the user collects (in this embodiment, captures or acquires) various characters (in this embodiment, monster characters) in the virtual game space, and trains the collected character by playing against another character. As an example, a different type game is games that some contents are different from each other, or games in series.

In this specification, a case where a single user deposits a character with the server 16 or withdraws a character from the server 16 will be described in the following, but each of a plurality of users can respectively deposit a character with the server 16 or withdraw a character from the server 16. That is, in the server 16, the character is managed for each user.

Moreover, although a case where a user deposits a character with the server 16 or withdraws a character from the server 16 using a single game apparatus 12 will be described in this specification, if the same user ID is registered in a plurality of game apparatuses 12, a game apparatus 12 that deposits a character with the server 16 and a game apparatus 12 that withdraws a character from the server 16 may be different game apparatuses. Therefore, for example, a smartphone that can be also used as a game apparatus can withdraw a character that is deposited by a portable game apparatus 12 to use the character in a game. This is just an example, and as described above, there are various game apparatuses 12 that can be used.

Figure 4:
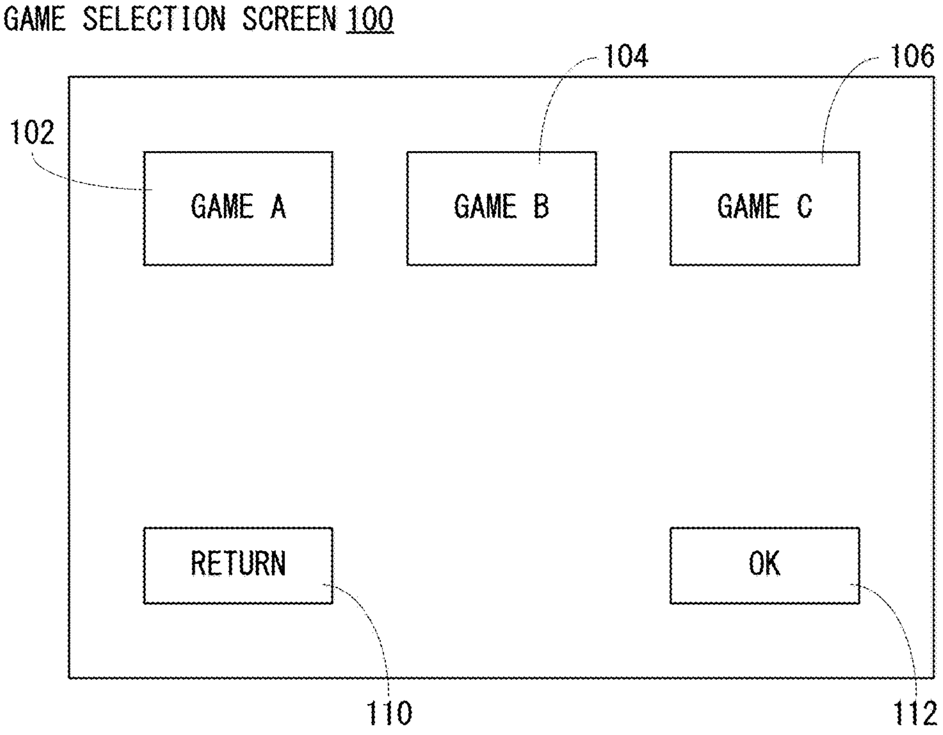
FIG. 4 is a view showing a non-limiting example game selection screen displayed on a display shown in FIG. 2.

FIG. 4 is a view showing a non-limiting example game selection screen 100 displayed on the display 36 of the game apparatus 12. The user executes, when depositing or withdrawing a character, a data management application of a client side ("client side data management program 302*f*", described later) stored in the game apparatus 12. Then, the game selection screen 100 for selecting a game using a character to be deposited or a game using a character withdrawn is displayed on the display 36.

Although illustration is omitted, in a main menu screen, selecting a game to be played, executing the client side data management application, or performing various kinds of settings is selected.

One or more icons (in FIG. 4, icons 102, 104 and 106) are displayed in the game selection screen 100, and three buttons 110, 112 and 112 are displayed in the game selection screen below the one or more icons.

The icon 102 is an icon for selecting a game A. The icon 104 is an icon for selecting a game B. The icon 106 is an icon for selecting a game C. Although illustration is omitted, as an example, the icon (here, icon 102, icon 104 or icon 106) is turned on in the game selection screen 100, it will be in a state where a game assigned to the turned-on icon is selected. Moreover, if the turned-on icon is turned on again, the state where the game assigned to the icon that is being turned on again is selected will be canceled.

Each of the game A, the game B and the game C is a game that can be played on the game apparatus 12, and each save data is stored in the flash memory 24 of the game apparatus 12. Game programs of the game A, the game B and the game C do not need to be stored in the game apparatus 12 always, and should just be stored in the game apparatus 12 when playing.

The save data includes game data generated and updated when playing a game, information indicative of a type of the game (for example, title), and information indicative of a user who plays the game (for example, user ID). Moreover, data on a character having been collected (hereinafter, referred to as "character data") is included in the game data as described above.

Although the save data is stored in the flash memory 24 incorporated in the game apparatus 12, should not need to be limited. The save data may be stored in a memory externally attached to the game apparatus 12. As the memory that is externally attached, an SD card, a USB memory or an external HDD that is attachable or detachable to or from the game apparatus 12 can be used. Moreover, the save data may be stored in a predetermined server on Cloud.

The button 110 is a button for stopping game selection and returning to the main menu screen. The button 112 is a button for confirming a selected game. If the button 112 is turned on, the game apparatus 12 can transfer a character according to an operation by the user in cooperation with the server 16.

Figure 5:
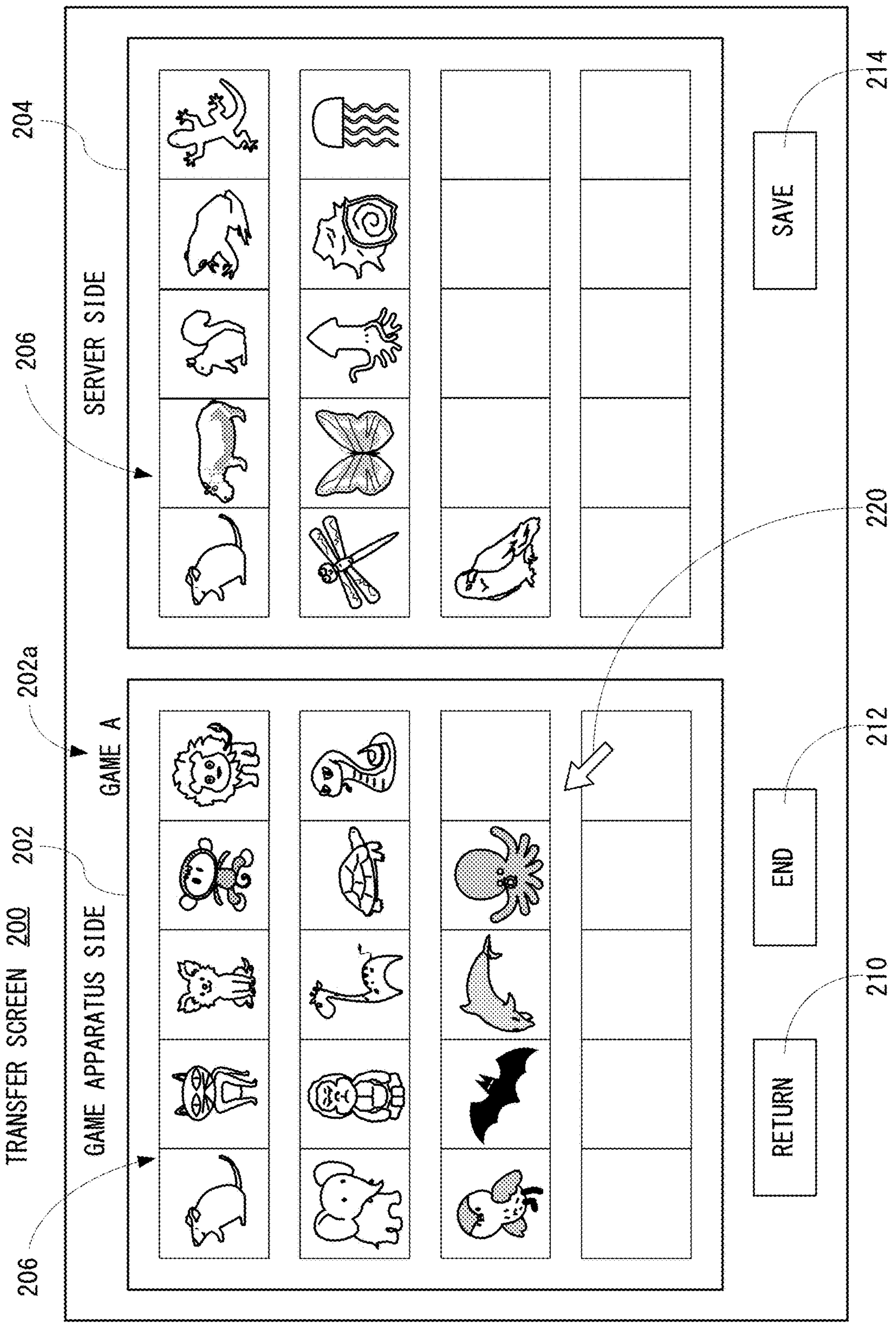
FIG. 5 is a view showing a non-limiting example transfer screen displayed on the display shown in FIG. 2.

FIG. 5 is a view showing a non-limiting example transfer screen 200 displayed on the display 36 of the game apparatus 12. The transfer screen 200 is displayed on the display 36 when the button 112 is turned on in the game selection screen 100 and a game that a character is to be transferred is selected.

In addition, in FIG. 5, an example of the transfer screen 200 on a case where the game A is selected in the game selection screen 100 is shown.

As shown in FIG. 5, the transfer screen 200 includes a display area 202 and a display area 204. The display area 202 is an area for displaying one or more character images 206 of one or more characters used in a virtual game (here, the game A) selected in the game selection screen 100 at a side of the game apparatus 12. That is, one or more character images 206 corresponding to the character data included in the save data of the virtual game are displayed. Moreover, a character string 202*a* indicative of the type of game (here, the game A) is displayed on the upper right of the display area 202. The display area 204 is an area for displaying one or more character images 206 of one or more characters being deposited with the server 16. However, the character images 206 displayed on the display area 202 and the display area 204 are the character images 206 of the characters that the same user owns.

Although illustration is omitted, what are displayed in the display area 202 and the display area 204 are the character images 206 of some characters, and the character images 206 of other characters owned by the user can be displayed by scrolling, respectively.

Although a detailed description is omitted, there are provided with a plurality of virtual boxes that save the characters used in the game apparatus 12 and a plurality of virtual boxes that save the characters deposited with the server 16, and by scrolling as described above, the virtual box is changed, whereby the character images 206 of one or more characters saved in the changed virtual box can be displayed. When no character is saved in the virtual box, the character image 206 is not displayed. Moreover, the virtual boxes are respectively attached with distinguishable information (serial number, as an example), and serial numbers of the virtual box that one or more characters being displayed are saved and the virtual box that no character is saved are displayed near the display area 202 and the display area 204, respectively. As an example, the serial numbers are displayed beside a character string of "game apparatus side" above the display area 202, and a character string "server side" above the display area 204, respectively. However, the display area 202 and the display area 204 can be scrolled individually. Moreover, as an example, the serial number of the virtual box that saves the character used on the game apparatus 12 is designated by the user, and the serial number of the virtual box that saves the character deposited with the server 16 is designated by the server 16 (i.e., the CPU 50).

Moreover, as shown in FIG. 5, the transfer screen 200 includes a button 210, a button 212 and a button 214. In an example shown in FIG. 5, the button 210 and the button 212 are provided below the display area 202, and the button 214 is provided blow the display area 204. The button 210 is a button for ending a transfer of the character, and returning to the game selection screen 100. The button 212 is a button for ending a transfer of the character, and returning to the main menu screen. The button 214 is a button for saving a state where the character has been transferred.

Furthermore, as shown in FIG. 5, a pointing image 220 is displayed in the transfer screen 200, and the user can select the character image 206, or can turn on the buttons 210, 212 or 214 by moving the pointing image 220.

When depositing a character with the server 16, the user selects one or more character images 206 being displayed in the display area 202, and transfers them to the display area 204. For example, the user drags and drops the selected one or more character images 206. This operation is also the same as when withdrawing the character. On the other hand, when withdrawing the character from the server 16, the user selects one or more character images 206 being displayed in the display area 204, and transfers them to the display area 202. The transfer of the character is settled by moving and saving the character image 206.

However, when returning to the game selection screen 100 or the main menu screen without saving, even when the character image 206 has been transferred, such a transfer of the character is not settled. That is, the transfer of the character is canceled.

Moreover, if the user selects again the selected one or more character images 206, a state where the one or more character images 206 are being selected is canceled. However, this is an example, and other ways may be sufficient as a method of canceling the state where the character image 206 is being selected.

Figure 12:
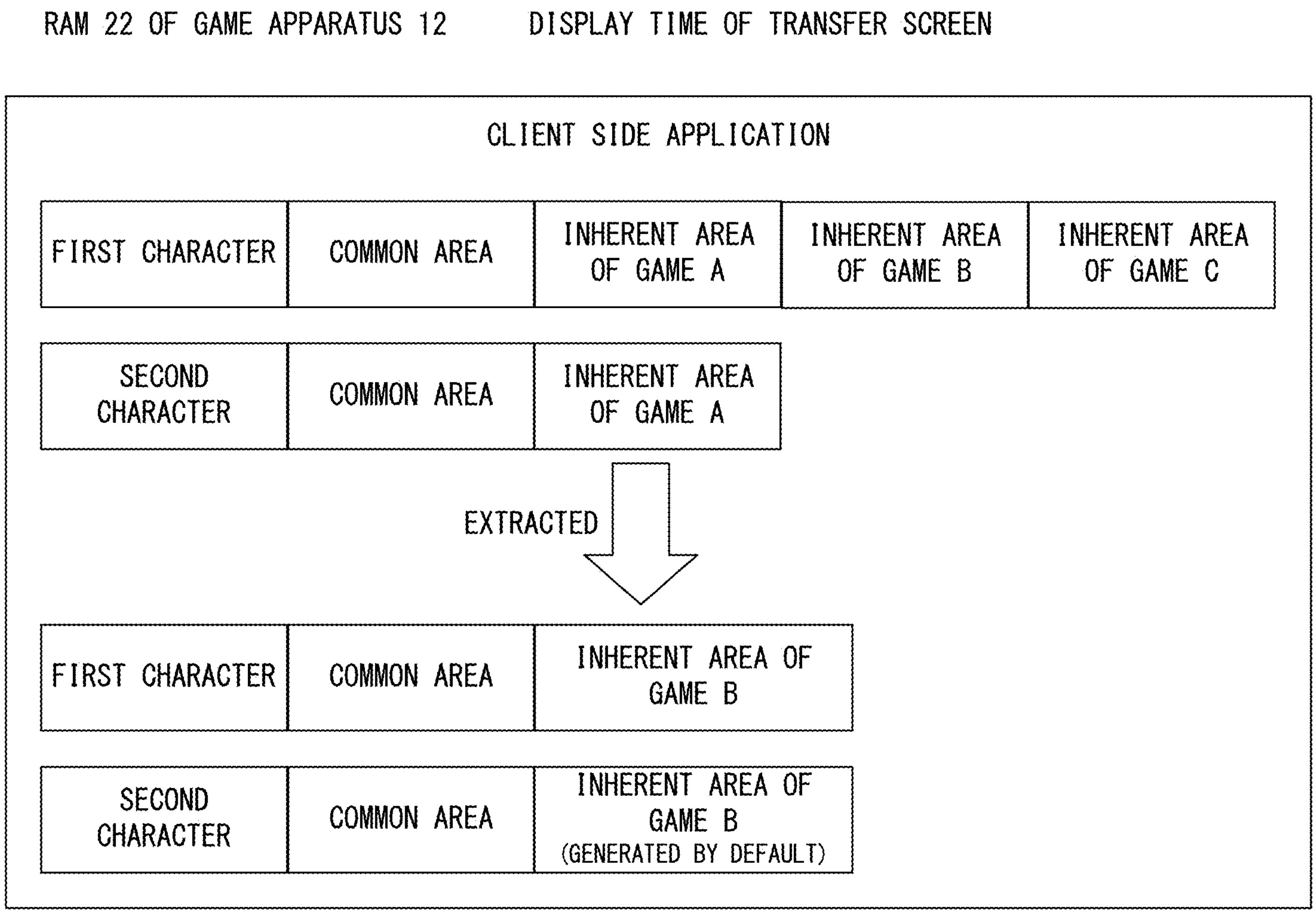
FIG. 12 is a view showing a part of a non-limiting example process in a case of withdrawing a character from the content holding server to the game apparatus.
Figure 13:
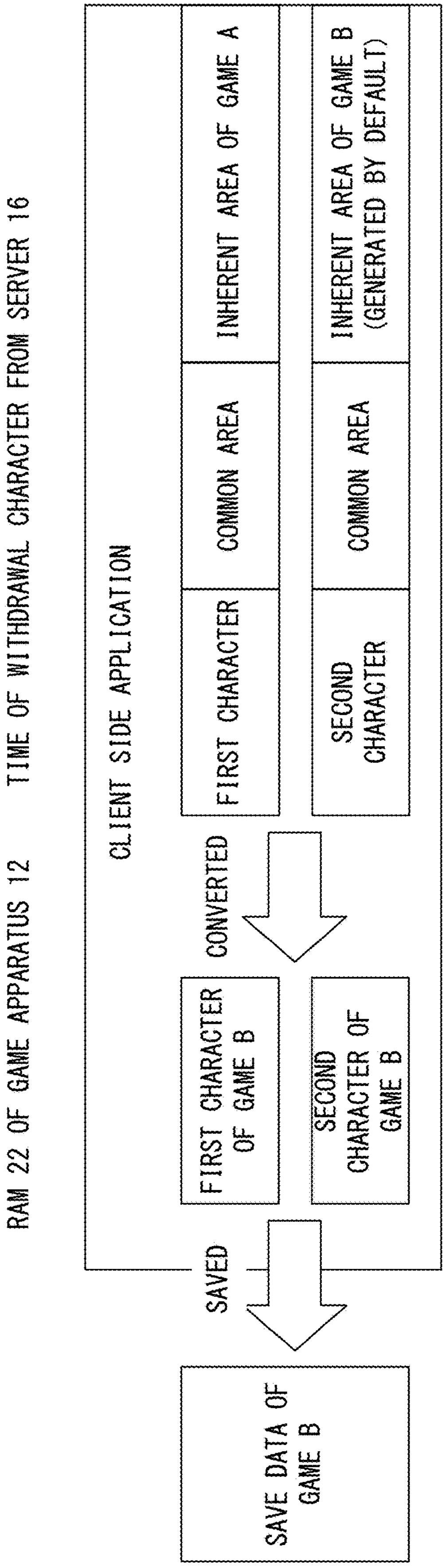
FIG. 13 is a view showing another part of the non-limiting example process in the case of withdrawing a character from the content holding server to the game apparatus.

FIG. 6-FIG. 9 are views showing processing in a case of depositing the character used on the game apparatus 12 with the server 16. FIG. 10 and FIG. 11 are views showing a format of character data held or managed by the server 16. FIG. 12-FIG. 13 are views showing processing in a case of withdrawing the character deposited with the server 16 for using in the game apparatus 12.

In the following, the processing in a case of depositing or withdrawing the character will be described with referring to FIG. 6-FIG. 13. However, in order to describe easy to be understood, in FIG. 6-FIG. 9, processing in a case of depositing with the server 16 a first character and a second character used in a game A on the game apparatus 12 will be shown. Moreover, similarly, in FIG. 12-FIG. 13, processing in a case of withdrawing the first character and the second character deposited with the server 16 in order to use in a game B on the game apparatus 12 will be shown.

However, it will be described that the first character has never been used in the past in the game A on the game apparatus 12.

Figure 6:
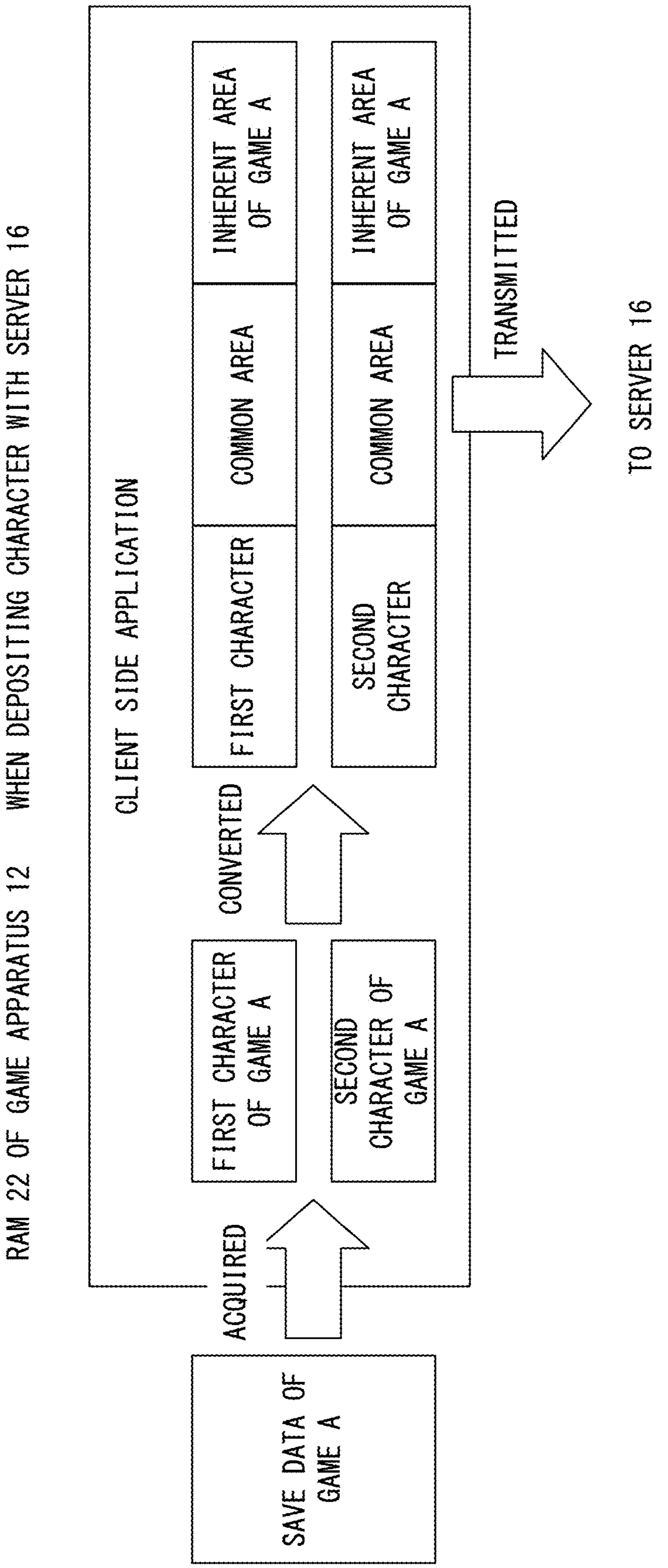
FIG. 6 is a view showing a non-limiting example process in a case of depositing a character with the content holding server from the game apparatus.

As shown in FIG. 6, when depositing with the server 16 the first character and the second character used in the game A, in the game apparatus 12, the client side data management program (also referred to as "client side application") acquires character data of the first character and character data of the second character from the save data of the game A.

Next, the client side application converts formats of the character data of the first character and the character data of the second character in order to save them with the server 16. Character data that the format is converted (hereinafter, may be referred to as "deposit character data") has a common area and an inherent area of the virtual game (here, game A). The common area includes a parameter group for a character used in common with multiple types of games out of a plurality of parameters used when using the character in a game. The inherent area of game includes a parameter group individually used in each of multiple types of games out of a plurality of parameters used when using the character in a game. The parameter group included in the common area and the parameter group included in the inherent area will be described later.

In addition, in FIG. 6, in order to show the character corresponding to the character data after format conversion, the first character and the second character are indicated, but identification information unique to the character is included in the common area as described later. This also applies to FIGS. 7-9, 12 and 13.

The client side application transmits the deposit character data that the format has been converted of the first character and the deposit character data that the format has been converted of the second character to the server 16.

When the character is deposited with the server 16, the server side data management program (also referred to as "server side application") applies unique identification information for managing this character (hereinafter, referred to as "unique ID"). This unique ID is issued by the server side application, and is applied to the character. It is because there is an inconvenience that the unique ID overlaps if issued by the game side application when the user uses a plurality of game apparatuses 12. The unique ID is unique information for managing the character by the server 16. However, as for the character that has been deposited with the server 16 once, since the unique ID has already been applied to the character, no unique ID is issued or applied again.

Here, it is assumed that the first character has been deposited with the server 16 and the second character has never been deposited with the server 16. Moreover, as for the character having been deposited once, management information is stored in the character management data base 54*a*, and character data of the character that has been deposited with the server 16 (hereinafter, may be referred to as "withdrawal character data") is stored in a character information data base 54*b*. The withdrawal character data is generated for each character and stored in the character information data base 54*b*.

The management information includes the user ID of a user who deposits a character, and further includes the unique ID of the character, the number of the virtual box that the character is saved and information indicating whether the character can be withdrawn (hereinafter, referred to as "flag information"), which are all associated with the user ID. The flag information is set to "true (i.e., withdrawable)" when the corresponding character is deposited with the server 16, and when the corresponding character is not deposited with the server 16, it is set to "false (i.e., on-withdrawable)." The withdrawal character data will be described in detail later.

Figure 7:
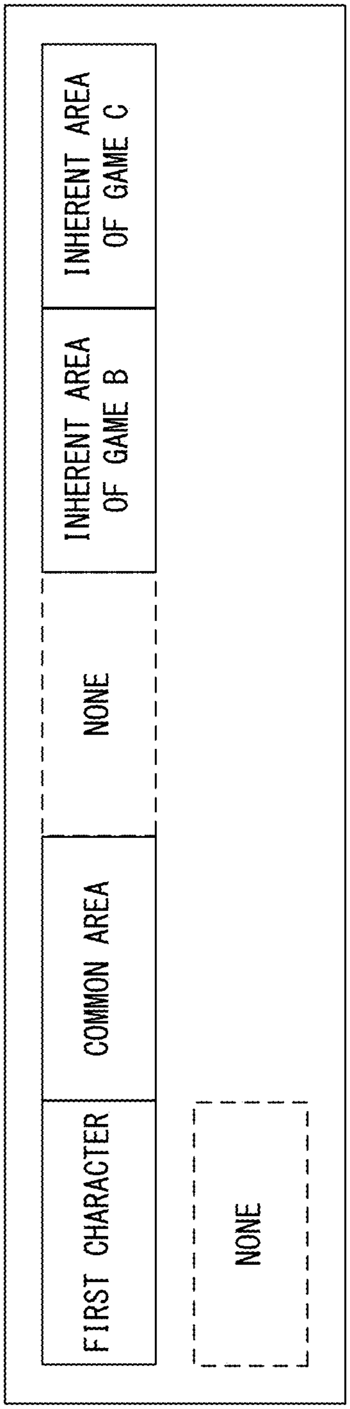
FIG. 7 is a view showing a non-limiting example data base that is managed by the content holding server, before depositing a character with the content holding server from the game apparatus.

Before depositing the first character and the second character with the server 16, as shown in FIG. 7, in the character information data base 54*b*, the withdrawal character data of the first character is held, but the withdrawal character data of the second character is not held.

As shown in FIG. 7, the withdrawal character data of the first character has a common area, an inherent area of the game B and an inherent area of the game C. As described later, the withdrawal character data has the common area and a work distinction area including one or more of inherent areas (see FIG. 10). In an example shown in FIG. 7, the withdrawal character data of the first character has an inherent area of the game B and an inherent area of the game C in the work distinction area. Therefore, it is possible to understand that the first character has been used by each of the game B and the game C on the game apparatus 12. Moreover, although the first character is used in the game A, it has never been deposited with the server 16 after used in the game A. Since the second character has never been deposited with the server 16 as described above, the withdrawal character data is not stored (or held) in the character information data base 54*b*. Moreover, as for the second character, the management information is also not stored in the character management data base 54*a*.

Figure 8:
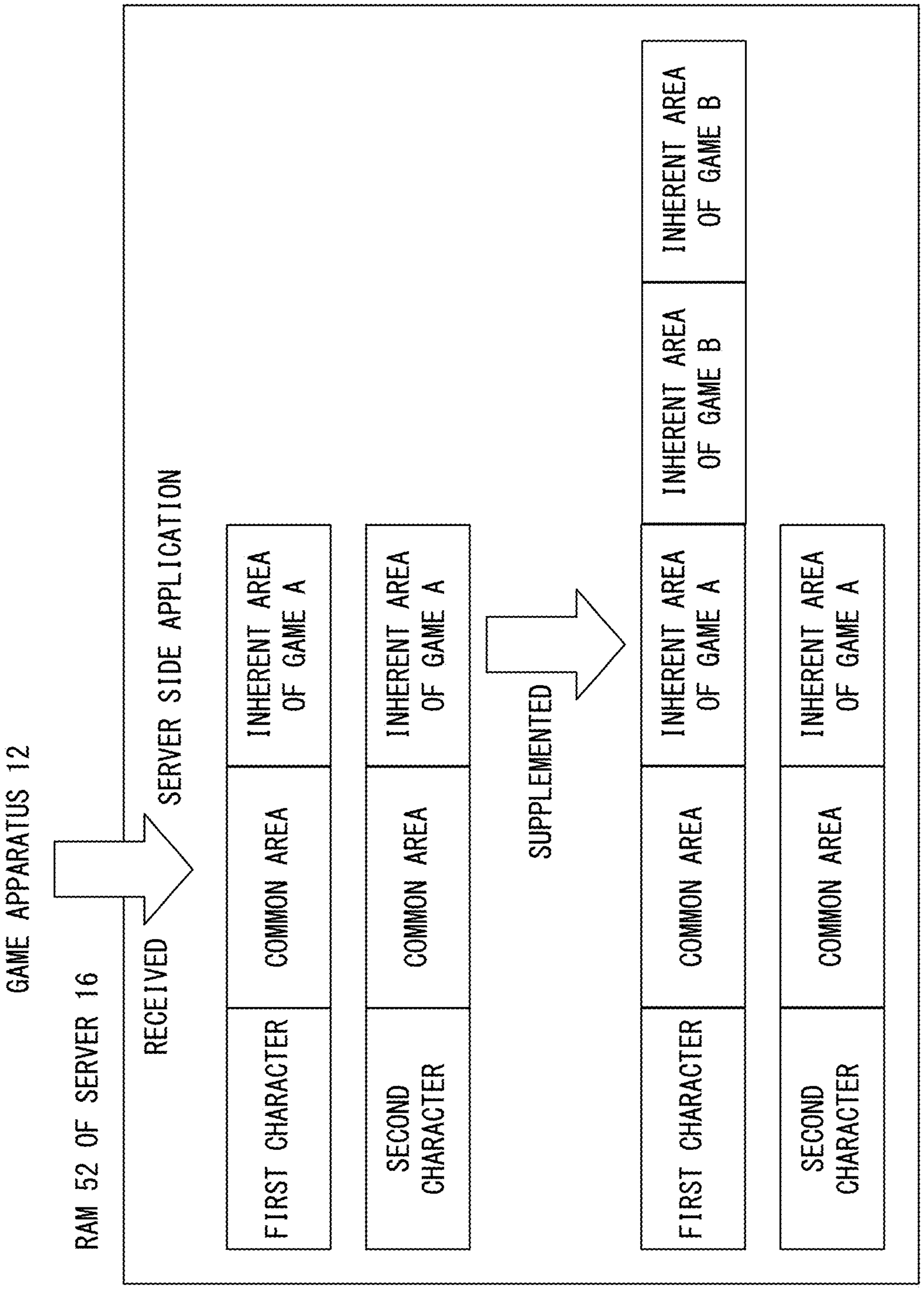
FIG. 8 is a view showing a non-limiting example character data supplemented by the content holding server in a case of depositing a character with the content holding server from the game apparatus.

As shown in FIG. 8, the server side application supplements the withdrawal character data of the first character stored in the character information data base 54*b* with the deposit character data of the first character received from the game apparatus 12. At this time, the parameter group of the common area included in the withdrawal character data of the first character is overwritten (i.e., updated) with the parameter group of the common area included in the received deposit character data.

Although illustration is omitted, when the first character has been used in the game A in the past, the inherent area of the game A is also included in the withdrawal character data, and therefore, in this case, the parameter group of the inherent area of the game A is overwritten with the parameter group of the inherent area of the game A included in the received deposit character data.

Moreover, if the deposit character data of the second character is received from the game apparatus 12, the server side application issues and applies the unique ID to the second character so as to generate the withdrawal character data of the second character.

When generating the withdrawal character data of the second character by supplementing the withdrawal character data of the first character, the server side application stores the withdrawal character data of the first character and the withdrawal character data of the second character into the character information data base 54*b*. That is, as shown in FIG. 9, the server side application overwrites the withdrawal character data having been supplemented of the first character in the character information data base 54*b*, and registers newly the generated withdrawal character data of the second character in the character information data base 54*b*.

Although a detailed description is omitted, when storing the withdrawal character data of the first character and the withdrawal character data of the second character in the character information data base 54*b*, the server side application updates the management information of the first character to be stored in the character management data base 54*a*, and generates the management information of the second character so as to store in the character management data base 54*a*.

Figure 9:
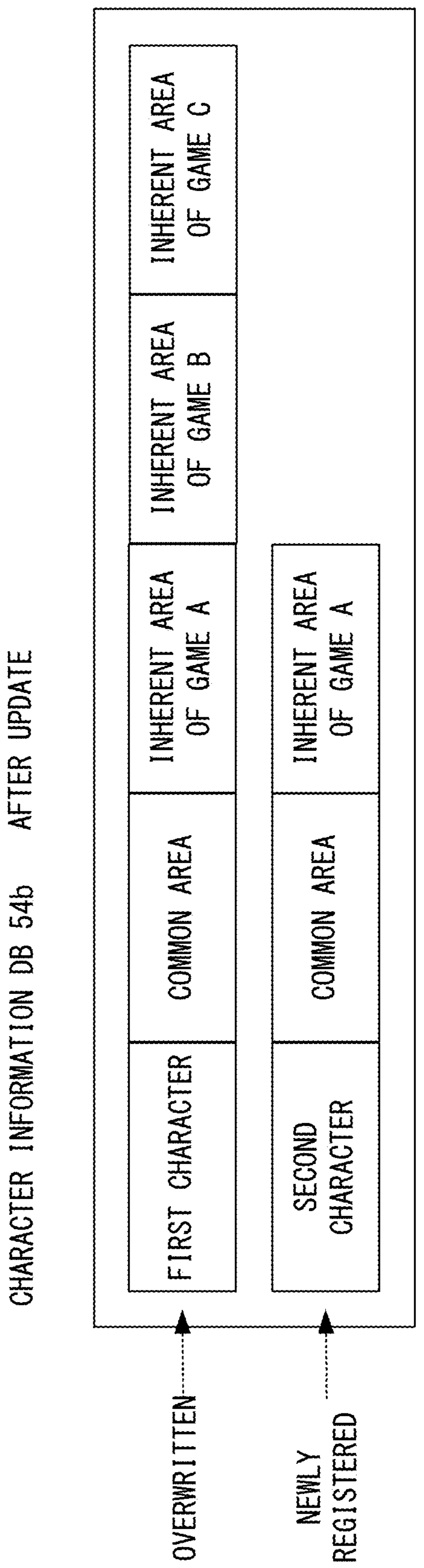
FIG. 9 is a view showing a non-limiting example data base that is managed by the content holding server in a case where a character is deposited with the content holding server from the game apparatus.

FIG. 10 shows non-limiting example withdrawal character data of the first character stored in the character information data base 54*b* as shown in FIG. 9. As shown in FIG. 10, the withdrawal character data of the first character includes the common area and the work distinction area.

In the common area, there are stored, as common information for the first character, with the unique ID, a monster type number, an experience value, a characteristic number, sexuality, an HP determination parameter A, an attack determination parameter A, a defense determination parameter A, a speed determination parameter A, a nickname, an HP determination parameter B, an attack determination parameter B, a defense determination parameter B, a speed determination parameter B, a version of a game that a monster is captured, a player name, a date of capture and a place of capture.

The unique ID is an inherent ID that is applied to the character (here, "first character"), and is applied by the server side application. The monster type number is a number indicating a type of the character. The experience value is an experience value of a battle, and as the experience value is increased, a level of the character is increased. The characteristic number is the number for identifying a characteristic that is set to the character. The sexuality is sexuality of the character, and is either male, female or of unknown sexuality.

The HP determination parameter A is a parameter for determining an HP of the character as a result of battle. However, the HP is a hit point indicating a physical strength of the character. The attack determination parameter A is a parameter for determining an attack power of the character as a result of battle. The defense determination parameter A is a parameter for determining a defense power of the character as a result of battle. The speed determination parameter A is a parameter for determining an attacking speed of the character as a result of battle. Each of the HP determination parameter A, the attack determination parameter A, the defense determination parameter A and the speed determination parameter A may be set to be increased up to a predetermined upper limit according to the number of times of battles in at least one of the games.

The nickname is a nickname that the user gives the character. The HP determination parameter B is a parameter for determining an HP of the character, which is set in advance for each character. The attack determination parameter B is a parameter for determining an attack power of the character, which is set in advance for each character. The defense determination parameter B is a parameter for determining defense of the character, which is set in advance for each character. The speed determination parameter B is a parameter for determining an attacking speed of the character, which is set in advance for each character. Each of the HP determination parameter B, the attack determination parameter B, the defense determination parameter B and the speed determination parameter B may be set with a random value within a predetermined range when the character is obtained first time in at least one of the games, and may be set so as not to change.

In at least one of games, a maximum HP of a character may be set to a value obtained by adding a predetermined fixed value determined in advance according to at least a type of monster, the HP determination parameter A and the HP determination parameter B. The same is true for the attack power, the defense power and the attacking speed.

The version of the game is information for identifying the version (or type) of the game that the character is captured or acquired. The player name is a name of the user who captured or acquired the character. The date of capture is a date that the character is captured or acquired (in this embodiment, Year Month Day). The place of capture is a place in the virtual space that the character is captured or acquired.

FIG. 11 shows non-limiting example specific contents of the work distinction area shown in FIG. 10. The work distinction area includes, for each type of game, inherent areas of one or more games that the character has been used in the past. In an example shown in FIG. 11, the work distinction area includes the inherent area of the game A, the inherent area of the game B and the inherent area of the game C.

In the inherent area of the game A, there are stored with, as the inherent information of the first character in the game A, a possession skill, a remaining number of times of the possession skill, a number of usage times of increasing number of times of the skill, a play degree of unique event and a capture item type.

The possession skill is a type of a skill that the character (here, "first character") can use in the game A. The remaining number of times of the possession skill is the number of times for each type of skills that the character can use in the game A. The number of usage times of increasing number of times of the skill is the number of times that the character can use items capable of increasing the number of usable times of the skill. The play degree of unique event is the number of times of playing or degree of playing the unique event using the character. The capture item type is a type of an item that the character acquired or obtained.

In the inherent area of the game B, there are stored with, as inherent information of the first character in the game B, a special individual flag, a size, a possession skill, a remaining number of times of the possession skill, an HP determination parameter C, an attack determination parameter C, a defense determination parameter C, a speed determination parameter C and a capture item type.

The special individual flag is flag information indicating that the character (here, "first character") is a special individual. In this embodiment, a character of the special individual means a character that is bigger, higher level and stronger than other characters existing in the circumference of the virtual space. When the character is the special individual, the flag information is set to "true". The size is a magnitude (in this embodiment, a height and weight) of the character in the virtual space. The possession skill is a type of skill that the character can use in the game B. The remaining number of times of the possession skill is the number of times for each type of skills that the character can use in the game B.

The HP determination parameter C is a parameter for determining an HP of the character as a result of battle. The attack determination parameter C is a parameter for determining an attack power of the character as a result of battle. The defense determination parameter C is a parameter for determining a defense power of the character as a result of battle. The speed determination parameter C is a parameter for determining an attacking speed of the character as a result of battle. The capture item type is a type of an item that is used when the character is captured.

In the game B, a maximum HP of a character may be set to a value obtained by adding a predetermined fixed value determined in advance according to at least a type of monster in the game B and the HP determination parameter C used in the game B, without using the HP determination parameter A and the HP determination parameter B both in the common area. The same is true for the attack power, the defense power and the attacking speed.

At this time, the character obtained in the game B can be used in a further game, by making initial values of the HP determination parameter C, the attack determination parameter C, the defense determination parameter C and the speed determination parameter C respectively correspond to the HP determination parameter B, the attack determination parameter B, the defense determination parameter B and the speed determination parameter B stored in the common area. These parameters may be linked to the game B, or may be supplemented when the character is used first time in the further game. Moreover, when the first character is obtained in the game B but not used in other games, the HP determination parameter A, the attack determination parameter A, the defense determination parameter A and the speed determination parameter A all remain 0 (zero).

In the inherent area of the game C, there are stored with, as inherent information of the first character in the game C, a possession skill, a remaining number of times of the possession skill, a number of usage times of increasing number of times of the skill, a play degree of unique event and a capture item type. Since respective inherent information are the same as contents described in the inherent area of the game A, a duplicate description will be omitted.

In addition, in order to describe briefly, FIG. 10 and FIG. 11 show a part of the parameter groups included in the common area and each inherent area.

Processing in a case of withdrawing the first character and the second character in order to use in the game B will be described using FIG. 12 and FIG. 13. When the game B is selected in the game selection screen 100 and the transfer screen 200 is displayed, according to a request of the game apparatus 12, the server 16 transmits to the requesting game apparatus 12 all the withdrawal character data of one or more characters being deposited. Therefore, the server 16 does not transmit to the game apparatus 12 the withdrawal character data of one or more characters not being deposited.

In the transfer screen 200, one or more characters that are being deposited with the server 16 can be displayed in the display area 204. As described above, since the first character and the second character are deposited with the server 16, the character image 206 of the first character and the character image 206 of the second character may be displayed in the display area 204 of the transfer screen 200.

In this case, the client side application extracts the common area and the inherent area of the game B for using the first character in the game B from the withdrawal character data for the first character, and displays the character image 206 of the first character in the display area 204 of the transfer screen 200 based on the common area and the inherent area that are extracted, i.e., the character data of the first character.

Moreover, the client side application extracts the common area from the withdrawal character data for the second character, generates the inherent area of the game B by default for using the second character in the game B, and displays the character image 206 of the second character in the display area 204 of the transfer screen 200 based on the extracted common area and the generated inherent area, i.e., the character data of the second character. As described above, since the second character is only used in the game A and not used in other games (here, the game B), the inherent area of the game B is not included in the withdrawal character data. Therefore, the character image 206 of the second character is displayed in the transfer screen 200, and further, the inherent area of the game B is generated by the default in order to use the second character in the game B.

Furthermore, when saving of the character image 206 of the first character and the character image 206 of the second character is performed in a state of being transferred to the display area 202, that is, when it is determined to withdraw the first character and the second character to be used in in the game B, the client side application makes the first character and the second character be included in the save data of the game B. Specifically, as shown in FIG. 13, the client side application converts the character data of the first character and the character data of the second character into the formats for using in the game B. Then, the client side application saves the character data of the first character and the character data of the second character having been converted, together with the character data of other characters used in the game B. That is, the save data of the game B including the character data of the first character and the character data of the second character is stored (overwritten) in the flash memory 24. Thus, the first character and the second character are withdrawn by the game apparatus 12 from the server 16.

That is, when withdrawing the character data, the client side application in the game apparatus 12 extracts the common area and the inherent area of the game from the withdrawal character data when using the character in a game that the character has been used in the past, and extracts the common area from the withdrawal character data and generates the inherent area of the game by default when using the character in a game that the character has never been used in the past.

Since the common area and the inherent area of the game are thus extracted from the withdrawal character data when using the withdrawn character in the game that the character has been used in the past, even if the inherent area of a further game is included in the withdrawal character data, it is not necessary for the game side using the withdrawn character to correspond to the inherent area of the further game.

When generating the inherent area of the game by default, the parameter group included in the inherent area is set to a suitable default value, for example, 0 (zero). Otherwise, when a compatible parameter is found with reference to other inherent areas, the parameter may be used. The compatible parameter is a capture item type, for example.

Moreover, if withdrawing the first character and the second character, the client side application notifies the server 16 (i.e., the server side application) that the first character and the second character are made disable to be withdrawn.

Therefore, in the server 16, the server side application sets the flag information included in the management information of the first character and the second character to "false (i.e., disable to withdraw)". In the management information, the user ID of the user of the game apparatus 12 that notified that the first character and the second character are made disable to be withdrawn is described.

Figure 14:
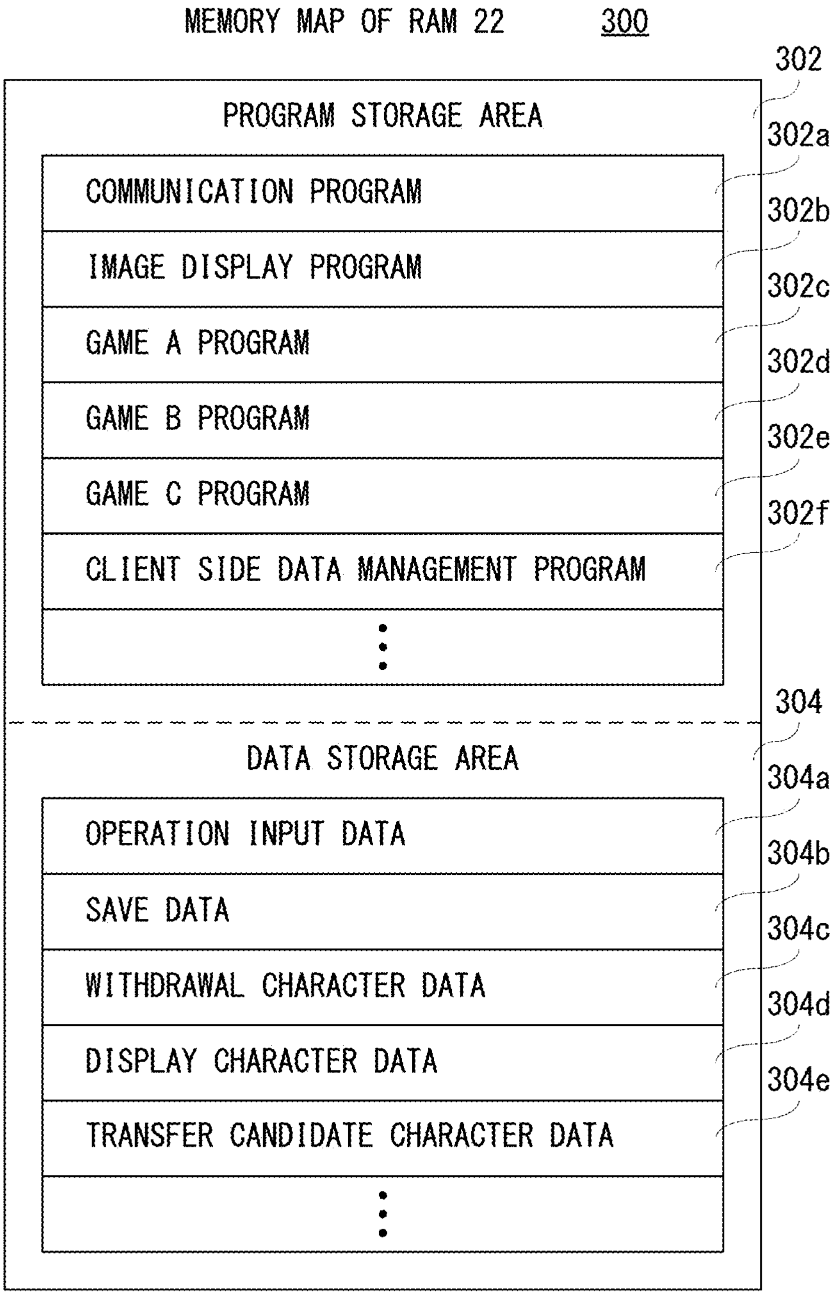
FIG. 14 is a view showing a non-limiting example memory map of a RAM incorporated in the game apparatus shown in FIG. 2.

FIG. 14 is a view showing a non-limiting example memory map 300 of the RAM 22 of the game apparatus 12 shown in FIG. 2. As shown in FIG. 14, the RAM 22 includes a program storage area 302 and a data storage area 304. The program storage area 302 is stored with a communication program 302*a*, an image display program 302*b*, a game A program 302*c*, a game B program 302*d*, a game C program 302*e*, a client side data management program 302*f*, etc.

The communication program 302*a* is a program for performing communication with other equipment (in this embodiment, the server 16, other game apparatuses, etc.) using the first communication module 26, and performing communication with other equipment (other game apparatuses, etc.) via a wireless LAN using the second communication module 28.

The image display program 302*b* is a program for generating data (game image data) of game images (above-described various kinds of screens 100 and 200, etc.), and outputting the generated game image data to the display 36. Therefore, the game image corresponding to the game image data is displayed on the display 36.

The game A program 302*c* is an application program of the game A. The game B program 302*d* is an application program of the game B. The game C program 302*e* is an application program of the game C.

The client side data management program 302*f* is an application program (i.e., client side application) for managing the character data on a side of client or a side of the game apparatus 12, and specifically, for performing data management processing (see FIG. 16-FIG. 18) described later of the client side.

Although illustration is omitted, the program storage area 302 is further stored with other programs, such as a program for saving the game data in the flash memory 24, a sound output program for generating and outputting a sound required for the game, etc.

In addition, the game A program 302*c*, the game B program 302*d* and the game C program 303*e* are not necessary to be stored always in the RAM 22, and may be acquired from the flash memory 24, another storage medium attachable to the game apparatus 12 or the network 14, when playing the game A, the game B or the game C.

The data storage area 304 is stored with operation input data 304*a*, save data 304*b*, withdrawal character data 304*c*, display character data 304*d*, transfer candidate character data 304*e*, etc.

The operation input data 304*a* is operation data that is input from the input device 30. The operation data is eliminated after used for processing of the CPU 20.

The save data 304*b* is save data of the game selected in the game selection screen 100 (in this embodiment, game A, game B or game C), and is read from the flash memory 24. Moreover, when the character is withdrawn, the save data 304*b* is updated, and then, stored (overwritten) in the flash memory 24.

The withdrawal character data 304*c* is withdrawal character data for each of one or more characters transmitted from the server 16 when displaying the transfer screen 200 on the display 36.

The display character data 304*d* is character data corresponding to each of the character images 206 of one or more characters to be displayed in the display area 202 of the transfer screen 200, and character data corresponding to each of the character images 206 of one or more characters to be displayed in the display area 204 of the transfer screen 200. However, the character data corresponding to the character images 206 are distinguishably classified into data to be displayed in the display area 202 (i.e., saved in the game apparatus 12) and data to be displayed in the display area 204 (i.e., deposited with the server 16).

The character data of one or more characters to be displayed in the display area 202 of the transfer screen 200 are character data of one or more characters acquired from the save data 304*b* of the game (in this embodiment, game A, game B or game C) selected in the game selection screen 100.

Moreover, the character data of one or more characters to be displayed in the display area 204 of the transfer screen 200 are the withdrawal character data for each of one or more characters having been transmitted from the server 16, and when displaying the transfer screen 200 at first, the withdrawal character data 304*c* are copied. However, what to be copied are the common area and the inherent area of the game selected on the game selection screen 100 out of the withdrawal character data for each of the one or more characters. As for the character that the inherent area of the game selected in the game selection screen 100 is not included in the withdrawal character data, the inherent area of the game selected in the game selection screen 100 is generated by default.

If the character image 206 is transferred between the display area 202 and the display area 204 in the transfer screen 200, in the display character data 304*d*, a classification of the display area 202 or the display area 204 for the character having been transferred is changed.

The transfer candidate character data 304*e* is data of the identification information of the character transferred between the display area 202 and the display area 204 in the transfer screen 200 and the identification information of the display area 202 or the display area 204 after transfer. Here, although the identification information of the character is unique ID, as for the character to which no unique ID is applied, the identification information is the deposit character data itself. Moreover, the identification information of the display area 202 is being at a side of the game apparatus 12 and the number of the virtual box at the side of the game apparatus 12, and the identification information of the display area 204 is being at a side of the server 16 and the number of the virtual box at the side of the server 16. However, if the character is transferred (i.e., returned) to the original display area 202 or the original display area 204, the transfer candidate character data 304*e* for that character is eliminated.

If saving is performed in the transfer screen 200, the character data of the character having been transferred to the display area 202 from the display area 204 is made to be included in the save data of the game being selected, and saved. Moreover, if saving is performed in the transfer screen 200, the character data of the character that is transferred to the display area 204 from the display area 202 is transmitted to the server 16, and the character data is deleted from the save data of the game being selected.

Although illustration is omitted, in the data storage area 304, other data required for data management processing may be stored, and flags and counters (timer) required for data management processing may be provided.

Figure 15:
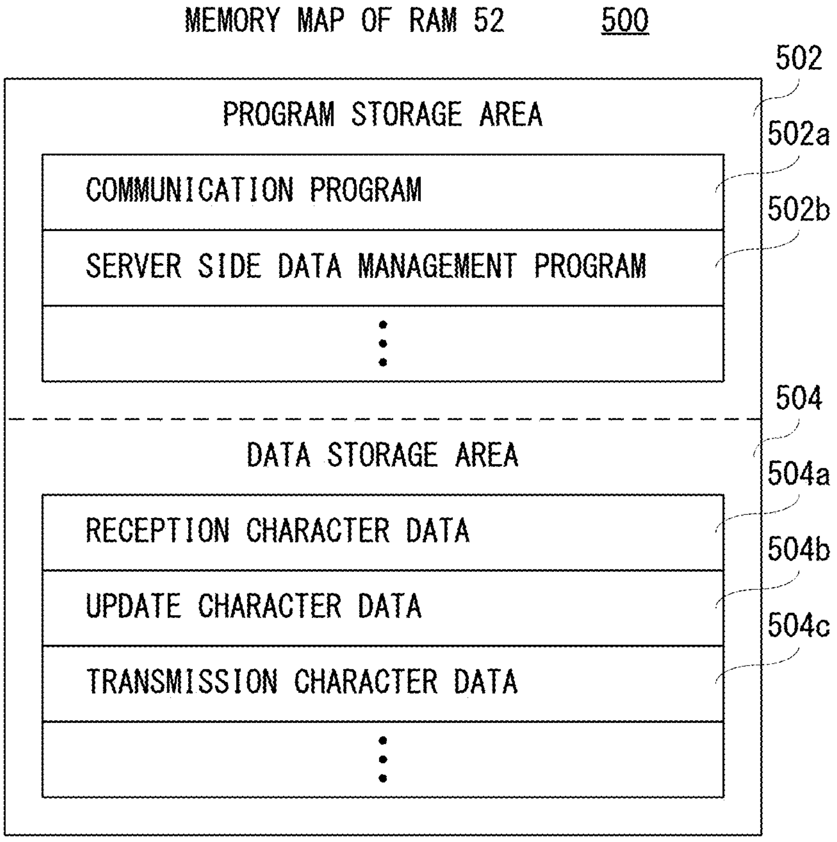
FIG. 15 is a view showing a non-limiting example memory map of a RAM incorporated in the content holding server shown in FIG. 3.

FIG. 15 is a view showing a non-limiting example memory map 500 of the RAM 52 of the server 16 shown in FIG. 3. As shown in FIG. 15, the RAM 52 includes a program storage area 502 and a data storage area 504. The program storage area 502 is stored with a communication program 502*a*, a server side data management program 502*b*, etc.

The communication program 502*a* is a program for performing communication with other equipment (in this embodiment, the game apparatus 12, other game apparatuses, etc.) using the communication module 56.

The server side data management program 502*b* is an application program (i.e., server side application) for managing the character data on a side of server 16, and specifically for performing data management processing described later (see FIG. 19) of the server side.

Although illustration is omitted, other programs required for data management are stored in the program storage area 502.

The data storage area 504 is stored with reception character data 504*a*, update character data 504*b*, transmission character data 504*c*, etc.

The reception character data 504*a* is one or more deposit character data received from the game apparatus 12. The update character data 504*b* is one or more withdrawal character data that are supplemented or generated when the game apparatus 12 deposits the character. The transmission character data 504*c* is one or more withdrawal character data for being transmitted to the game apparatus 12, and is acquired from the character information data base 54*b*.

Although illustration is omitted, in the data storage area 504, other data required for data management processing may be stored, and flags and counters (timers) required for data management processing may be provided.

Figure 16:
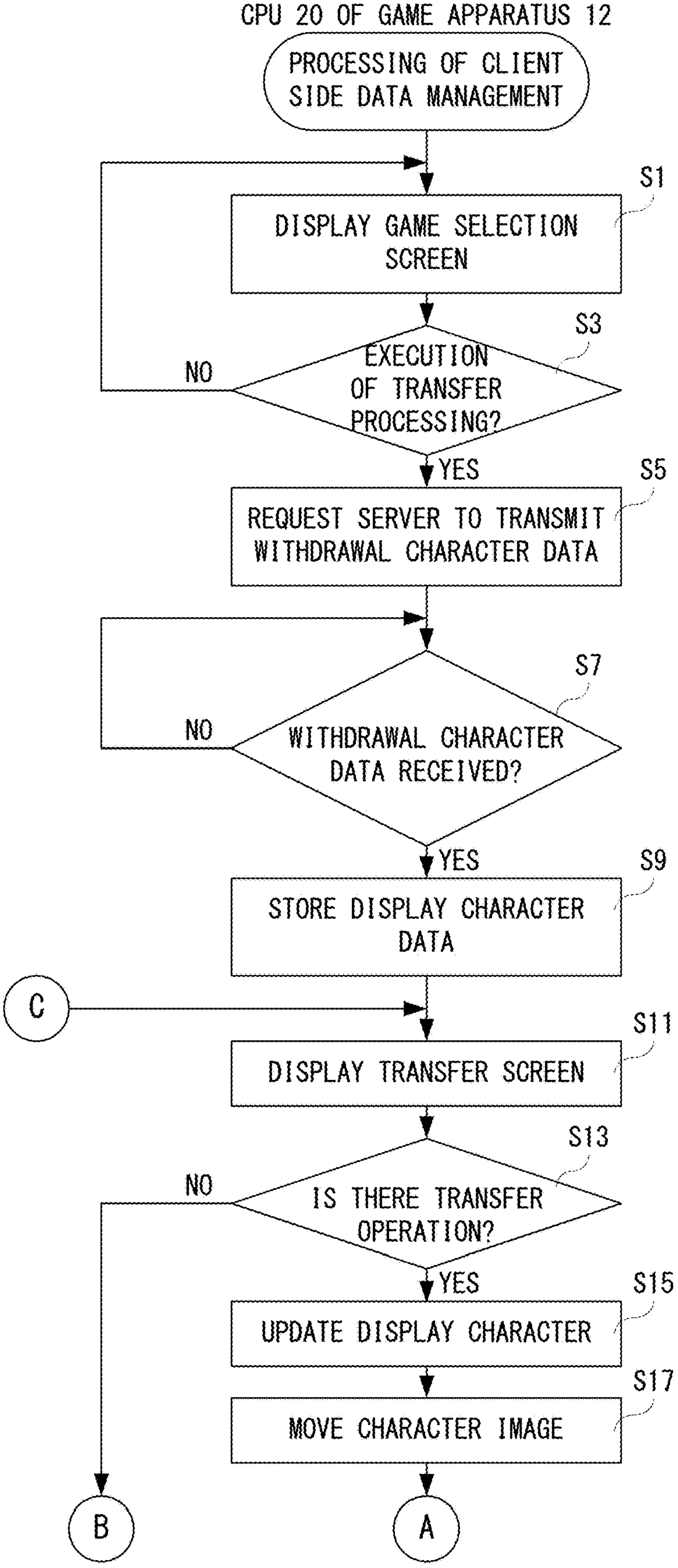
FIG. 16 is a flowchart showing a part of non-limiting example data management processing of a CPU incorporated in the game apparatus shown in FIG. 2.
Figure 17:
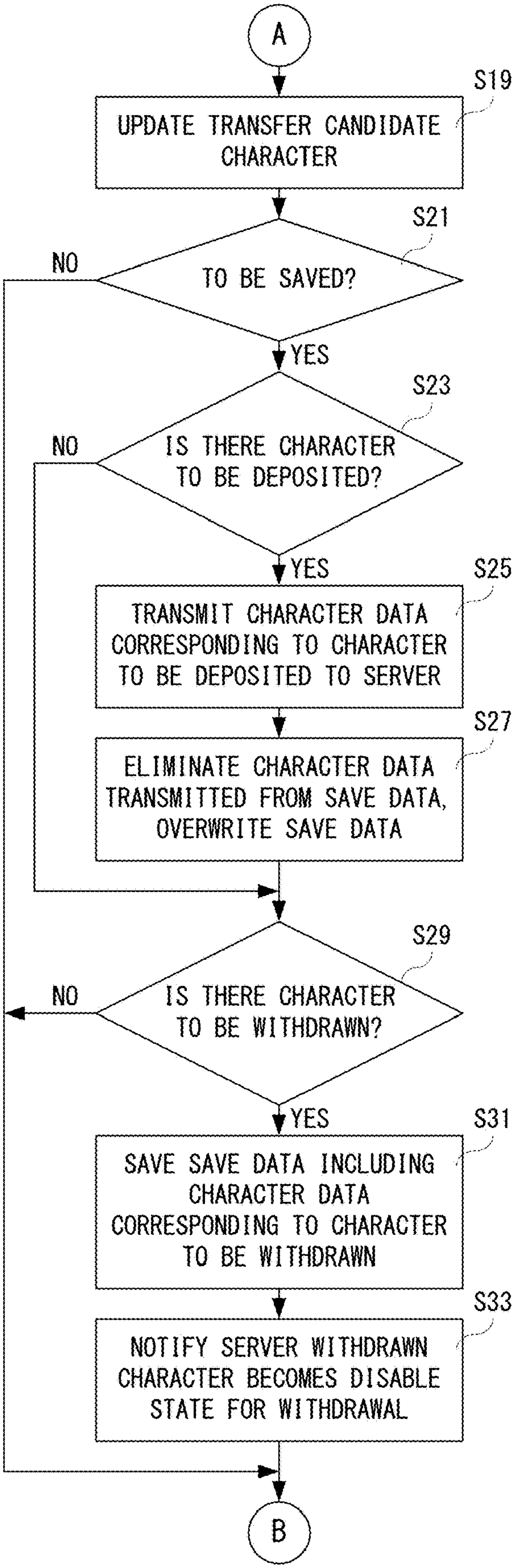
FIG. 17 is a flowchart showing another part of the non-limiting example data management processing of the CPU incorporated in the game apparatus shown in FIG. 2, following FIG. 16.
Figure 18:
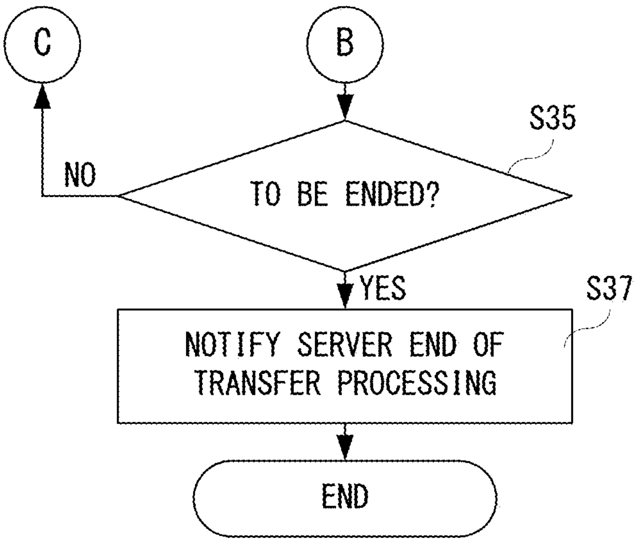
FIG. 18 is flowchart showing the other part of the non-limiting example data management processing of the CPU incorporated in the game apparatus shown in FIG. 2, following FIG. 17.

FIG. 16-FIG. 18 are flowcharts showing non-limiting example data management processing by the CPU 20 shown in FIG. 2 on the client side. This data management processing is started in response to pointing by the user to execute the data management application. Although a detailed description is omitted, from the time when the user points the execution of the client side application until the server 16 is requested to transmit the withdrawal character data, the user of the game apparatus 12 is authenticated by the server 16.

As shown in FIG. 16, if the data management processing is started, the CPU 20 displays, in a step S1, the game selection screen 100 as shown in FIG. 4 on the display 36. In a next step S3, it is determined whether character transfer processing is to be executed. Here, it is determined whether the button 112 is turned on in a state where the icon 102, 104 or 106 is turned on.

If "NO" is determined in the step S3, that is, if it is not the execution of the character transfer processing, the process returns to the step S1. However, when the user turns on the icon 102, 104 or 106, the game assigned to the turned-on icon 102, 104 or 106 is selected, or selection of the assigned game is canceled. However, when the user turns on the button 110, the data management processing is terminated, and the process returns to the main menu. On the other hand, if "YES" is determined in the step S3, that is, if it is the execution of the character transfer processing, a transmission of the withdrawal character data 304*c* is requested to the server 16 in a step S5.

Subsequently, it is determined, in a step S7, whether the withdrawal character data 304*c* is received from the server 16. If "NO" is determined in the step S7, that is, if the withdrawal character data 304*c* is not received, the process returns to the step S7.

On the other hand, if "YES" is determined in the step S7, that is, if the withdrawal character data 304*c* is received, the display character data 304*d* is stored in a step S9. Here, the CPU 20 reads the save data of the game selected in the game selection screen 100 from the flash memory 24, and further reads the character data from this save data, and generates the display character data 304*d* that the read character data and the received withdrawal character data are distinguishably classified, respectively so as to store in the data storage area 304. At this time, as for the withdrawal character data of the character that has never used in the game selected on the game selection screen 100, the CPU 20 generates the inherent area of the game by default so as to apply to the withdrawal character data.

In a subsequent step S11, the transfer screen 200 as shown in FIG. 5 is displayed on the display 36. In a next step S13, it is determined whether there is any transfer operation. If "NO" is determined in the step S13, that is, if there is no transfer operation, the process proceeds to a step S35 shown in FIG. 18. However, even if there is no transfer operation, according to an operation by the user, the pointing image 220 is moved, one or more character images 206 are selected, or the selection of one or more character images 206 is canceled. Moreover, when the user turns on the button 210, the transfer of the character is ended, and the process returns to the step S1.

On the other hand, if "YES" is determined in the step S13, that is, if there is a transfer operation, the display character data 304*d* is updated in a step S15 according to the transfer operation, and the character image 206 is transferred in a step S17 according to the transfer operation, and the transfer candidate character data 304*e* is updated in a step S19 shown in FIG. 17. Here, the transfer candidate character data 304*e* as for the character data corresponding to the character image 206 transferred according to the transfer operation is generated and stored, and the transfer candidate character data 304*e* as for the character data corresponding to the character image 206 transferred to the original display area 202 or the display area 204 is eliminated.

In a subsequent step S21, it is determined whether it is to be saved. Here, the CPU determines whether the button 214 is turned on. If "NO" is determined in the step S21, that is, it is not to be saved, the process proceeds to a step S35. On the other hand, if "YES" is determined in the step S21, that is, if it is to be saved, it is determined, in a step S23, whether there is any character to be deposited. Here, the CPU 20 determines whether there is the transfer candidate character data 304*e* including the identification information of the display area 204.

If "NO" is determined in the step S23, that is, if there is no character to be deposited, the process proceeds to a step S29. On the other hand, if "YES" is determined in the step S23, that is, if there is a character to be deposited, the character data corresponding to the character to be deposited, i.e., the deposit character data is transmitted to the server 16 in a step S25. However, in the step S25, the CPU 20 performs a format conversion so as to generate the deposit character data before transmitting the deposit character data to the server 16. In a next step S27, the transmitted character data, that is, the character data of the character deposited with the server 16 is deleted from the save data 304*b*, and the save data 304*b* that the character data is deleted is overwritten in the flash memory 24, and the process proceeds to the step S29.

In addition, when the number of the characters to be deposited is two or more, the processing in the steps S25 and S27 are executed for each of the two or more character to be deposited.

In the step S29, it is determined whether there is any character to be withdrawn. Here, the CPU 20 determines whether there is the transfer candidate character data 304*e* including the identification information of the display area 202.

If "NO" is determined in the step S29, that is, if there is no character to be withdrawn, the process proceeds to the step S35. On the other hand, if "YES" is determined in the step S29, that is, if there is a character to be withdrawn, the save data including the character data corresponding to the character to be withdrawn is saved in the flash memory 24 in a step S31, and notifies, in a step S33, the server 16 that the character having been withdrawn is made to be disable to be withdrawn, and the process proceeds to the step S35.

In addition, when the number of the characters to be withdrawn is two or more, processing in the steps S31 and S33 are executed for each of the two or more characters to be withdrawn.

Moreover, the character data corresponding to the character to be withdrawn is converted, when to be included to the save data and saved, into the format used in the game.

As shown in FIG. 18, it is determined whether the processing is to be ended in the step S35. Here, the CPU 20 determines whether the button 212 is turned on. If "NO" is determined in the step S35, that is, if the processing is not to be ended, the process returns to the step S11 shown in FIG. 16. On the other hand, if "YES" is determined in the step S35, that is, if the processing is to be ended, in a step S37, an end of the transfer processing is notified to the server, and the data management processing is terminated.

Figure 19:
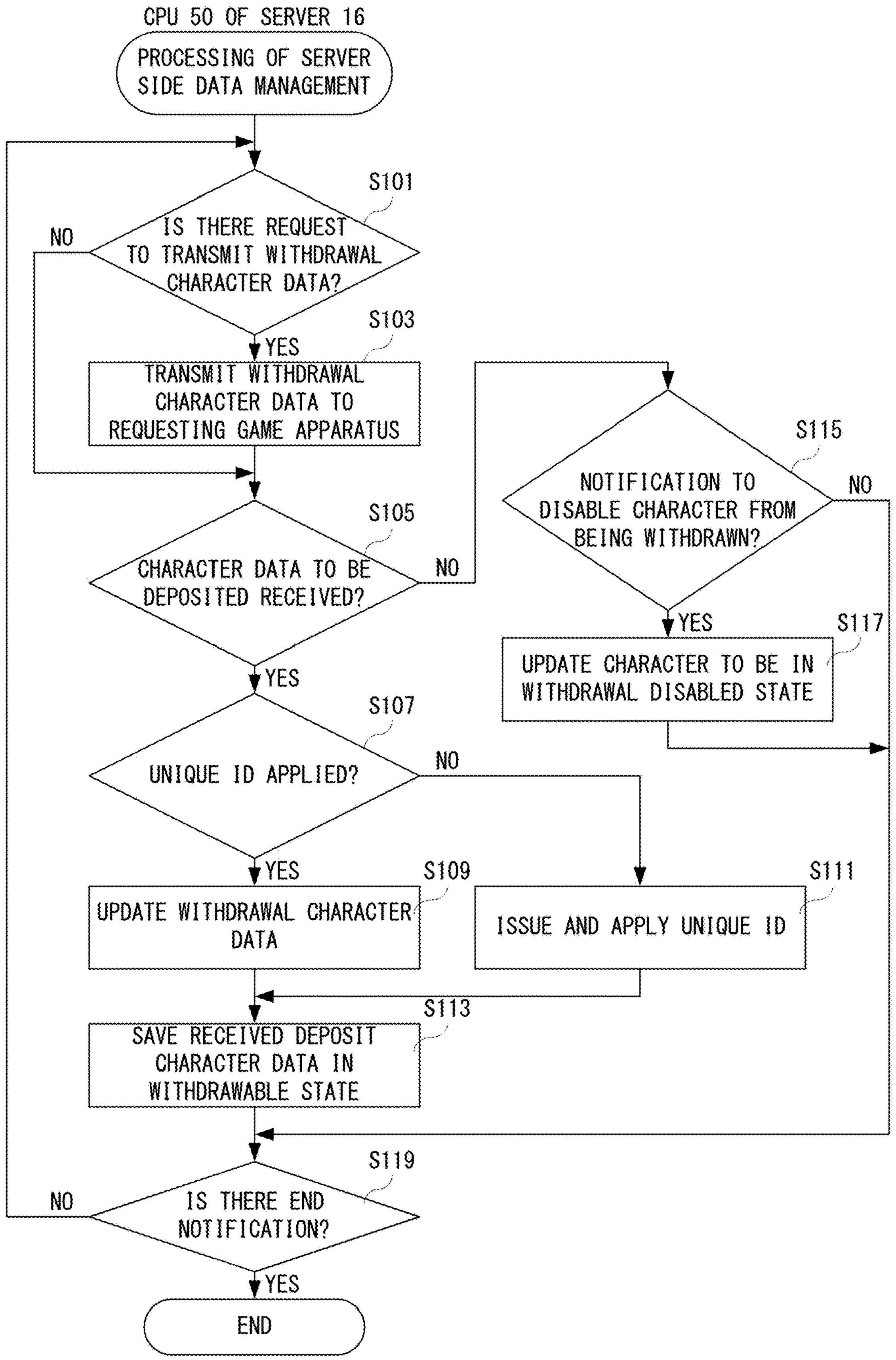
FIG. 19 is a flowchart showing non-limiting example data management processing of a CPU incorporated in the content holding server shown in FIG. 3.

FIG. 19 is a flowchart showing non-limiting example server side data management processing by the CPU 50 of the server 16 shown in FIG. 3. Although a detailed description is omitted, from the time when the user points the execution of the client side application until the server 16 is requested to transmit the withdrawal character data, the server 16 authenticates the user using the user ID of the user of the game apparatus 12.

As shown in FIG. 19, if the server side data management processing is started, the CPU 50 determines, in a step S101, whether there is any request for transmission of the withdrawal character data. If "NO" is determined in the step S101, that is, if there is no request for transmission of the withdrawal character data, the process proceeds to a step S105. On the other hand, if "YES" is determined in the step S101, that is, if there is a request for transmission of the withdrawal character data, in a step S103, the withdrawal character data is transmitted to the requesting game apparatus 12, and then, the process proceeds to the step S105. However, the withdrawal character data is the withdrawal character data of the character that the user of the requesting game apparatus 12 owns.

In the step S105, it is determined whether the deposit character data is received. If "YES" is determined in the step S105, that is, if the deposit character data is received, it is determined, in a step S107, whether the unique ID is applied to the received deposit character data.

If "YES" is determined in the step S107, that is, if the unique ID is applied to the received deposit character data, in a step S109, the withdrawal character data, that is, the common area and the work distinction area of the withdrawal character data are updated, and then, the process proceeds to a step S113. On the other hand, if "NO" is determined in the step S107, that is, if no unique ID is applied to the received deposit character data, in a step S111, the unique ID is issued and applied to the received deposit character data, and then, the process proceeds to the step S113.

In the step S113, the received deposit character data is saved in a withdrawable state, and the process proceeds to a step S119. That is, in the step S113, the character corresponding to the received deposit character data is deposited with the server 16, and the updated withdrawal character data is stored in the character information data base 54*b*, and the management information that the flag information is set to "true" of the character is stored (updated) in the character management data base 54*a*. However, as for the character that the unique ID is presently issued, in the step S113, the management information is generated and the flag information is set to "true" at this time.

Moreover, if "NO" is determined in the step S105, that is, if the deposit character data is not be received, it is determined, in a step S115, whether a notice that the character is made disable to be withdrawn is received. If "NO" is determined in the step S115, that is, if the notice that the character is made disable to be withdrawn is not received, the process proceeds to the step S119. On the other hand, if "YES" is determined in the step S115, that is, if a notice that the character is made disable to be withdrawn is received, it is updated that the character is made to be a non-withdrawable state in a step S117, and the process proceeds to the step S119. In the step S117, the CPU 50 sets the flag information included in the management information of the character to "false".

In the step S119, it is determined whether there is any notice of an end of the transfer processing from the game apparatus 12. If "NO" is determined in the step S119, that is, if there is no notice of an end of the transfer processing from the game apparatus 12, the process returns to step S101. On the other hand, if "YES" is determined in the step S119, that is, if there is a notice of an end of the transfer processing from the game apparatus 12, the data management processing is terminated.

According to this embodiment, since in the withdrawal character data, only the common area and the inherent area used in a certain game are updated or supplemented and held by the server, another inherent area of the withdrawal character data can be used other games. Therefore, a single character can be used in multiple types of games. That is, when using the character in multiple types of games, it is possible to hold the character in a state where different parameters can be used for each type of game.

In addition, although the character used for the game is deposited with the server and the withdrawal character data including the inherent area of the game is updated or generated in this embodiment, as for a specific type of game executable on the game apparatus, regardless of whether the character has been used in the specific type of game, when generating the withdrawal character data, the inherent area of the specific type of game may be included in the withdrawal character data. In this case, it is possible to ensure that the inherent area of the specific game is included for some purpose. As an example, it is possible to prevent the use of the withdrawal character data that is illegally generated by keeping the client side application from using the withdrawal character data not including the inherent area of the specific type of game. That is, it is possible to make the inherent area of the specific game be included in the withdrawal character data for the purpose of a illegality check.

Moreover, although the server is provided so that the character is deposited with the server or the character is withdrawn from the server in this embodiment, it does not need to be limited to this. The character may be deposited with the game apparatus or the character may be withdrawn from the game apparatus. In this case, for example, the character management data base and the character information data base may be provided in the flash memory of the game apparatus, and the game apparatus may also executes the server side data management processing shown in FIG. 19.

Furthermore, in this embodiment, when withdrawing the character, the client side application generates the inherent area of the game that has never been used by the default, but it does not need to be limited to this. When the server side application generates the withdrawal character data, one or more inherent areas of the executable multiple types of games may be generated by default except the inherent area that is not included in the deposit character data received from the game apparatus.

Furthermore, although this embodiment is described in a case where the character that is an example of the content is deposited with or withdrawn from the server, it should not be limited. It is possible to deposit or withdraw an item(s) used in multiple types of games with or from the server.

Moreover, various kinds of game images and structure of the game apparatus shown in this embodiment are mere examples, should not be limited, and is modifiable suitably according to an actual product(s).

Furthermore, when the same or similar effect (result) is obtainable, an order of the respective steps shown in the flowcharts in the above may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A content holding system comprising:

a server; and at least one information processing terminal connectable to the server, wherein the server comprises a content storage medium that stores content data usable in multiple types of games; and a first processor that is configured to execute a server control program that manages the content data, and the content data stored in the content storage medium has, for each content, a common area that includes a parameter group commonly used in the multiple types of games and an inherent area that includes a parameter group used individually for each of the multiple types of games, out of a plurality of parameters that are used when using a character in a first game of the multiple types of games, and the information processing terminal comprises a first save data storage medium and a second save data storage medium, the first save data storage medium configured to store first save data of the first game, and the second save data storage medium configured to store second save data that is save data of a second game of the multiple types of games; and a second processor that is configured to execute a client program that manages the content to be transmitted to or received from the server, wherein the client program is configured to cause the second processor to:

read the first save data from the first save data storage medium;

generate, based on the first save data, as for at least one first content used in the first game, deposit content data that includes a common area and a first inherent area, wherein the first inherent area is associated with the first game; and transmit the generated deposit content data to the server, wherein the server control program is configured to cause the first processor to:

based on reception of the deposit content data related to the first content, store, in the content storage medium as latest content data related to the first content, content data that includes 1) the common area, 2) the first inherent area, and 3) an inherent area other than the first inherent area being held when content data having the inherent area other than the first inherent area is held in the content storage medium in connection to the first content, wherein the server control program causes, based on a request for transmission of the first content used in the second game from the information processing terminal, the first processor to:

generate, based on the content data of the first content, withdrawal content data that includes the common area a further second inherent area that is associated with the second game; and transmit the withdrawal content data to the information processing terminal, and the client program causes the second processor to update the second save data so as to include the first content based on the common area and the second inherent area included in the withdrawal content data.

2. The content holding system according to the claim 1, wherein the withdrawal content data includes the common area and all held inherent areas in the content data related to the first content.

3. The content holding system according to the claim 1, wherein the client program is further configured to cause the second processor to generate, when the second inherent area is not included in the received-withdrawal content data, a parameter group corresponding to the second area so as to update the second save data, and to store the updated second save data in the second save data storage medium.

4. The content holding system according to the claim 1, wherein the server control program is further configured to cause the first processor to:

store the content data that the first content is made to be withdrawable state when the deposit content data related to the first content is received from the information processing terminal, transmit, when there is a request for transmission of the first content from the information processing terminal in a state where the first content is withdrawable, the withdrawal content data while remaining the content data being held, and; and hold the content data so that the first content data is made disabled to be withdrawn when the first content is being stored to be included in the second save data in the second save data storage medium.

5. The content holding system according to the claim 1, wherein the common area of the content data includes at least an ID unique to the content, and the server control program is further configured to cause, when the deposit content data is received from the information processing terminal, the first processor to store the content data in the content storage medium while newly applying an ID if no ID is included in the first content.

6. The content holding system according to the claim 1, wherein the deposit content data further includes a third inherent area corresponding to a third game that is either of the multiple types of games.

7. A non-transitory computer readable storage medium that stores a content management program executable by a computer of an information processing apparatus that is configured to communicate with a server configured to store content data usable in multiple types of games, wherein the information processing apparatus comprises a first save data storage medium and a second save data storage medium, the first save data storage medium configured to store first save data of a first game, and a second save data storage medium configured to store second save data that is save data of a second game of the multiple types of games, and the content management program comprising instructions configured to cause a processor of the computer to perform operations comprising:

read the first save data from the first save data storage medium based on a first pointing instruction;

generate, based on the first save data, as for at least one first content used in the first game, deposit content data that includes a common area and a first inherent area, wherein the first inherent area is associated with the first game;

transmit the generated deposit content data to the server;

perform, based on a second pointing instruction, a request for transmission of the first content that is used in a second game that is either of the multiple types of games to the server;

receive from the server, according to the request for transmission, in connection to the first content, withdrawal content data that includes the common area a further second inherent area that is associated with the second game; and update the second save data so as to include the first content based on the common area and the second inherent area included in the withdrawal content data.

8. A content holding server comprising:

a content storage medium configured to store content data that is data of at least one content that is usable in multiple types of games, for each content, wherein the content data stored in the content storage medium has, for each content, a common area that includes a parameter group commonly used in the multiple types of games and an inherent area that includes a parameter group used individually for each of the multiple types of games, out of a plurality of parameters that are used when using a character a first game of the multiple types of games; and at least one hardware processor configured to execute a control program that manages the content data, the control program comprising instructions that are configured to cause the at least one hardware processor to perform operations comprising:

receiving, from an information processing terminal, deposit content d that includes a comm rea and a first inherent area, wherein the first inherent area is associated with the first game that is either of multiple types of games related to a first content;

storing, in the content storage medium as latest content data related to the first content, content data that includes 1) the common area, 2) the first inherent area, and 3) an inherent area other than the first inherent area being held when content data having the inherent area other than the first inherent area is held in the content storage medium in connection to the first content;

receiving a request for transmission of the first content used in a second game from the information processing terminal;

generating, based on the request for transmission of the first content used in the second game from the information processing terminal and the content data of the first content, withdrawal content data that includes the common area a further second inherent area that is associated with the second game; and transmitting the withdrawal content data to the information processing terminal while making the content storage medium hold the content data.

* * * * *